United States Patent
Davydov et al.

(10) Patent No.: US 10,873,969 B2
(45) Date of Patent: *Dec. 22, 2020

(54) BEAM MANAGEMENT FOR CARRIER AGGREGATION (CA)

(71) Applicant: APPLE INC., Cupertino, CA (US)

(72) Inventors: Alexei Davydov, Nizhny Novgorod (RU); Hong He, Sunnyvale, CA (US); Gang Xiong, Portland, OR (US); Sameer Pawar, Santa Clara, CA (US); Yushu Zhang, Beijing (CN); Guotong Wang, Beijing (CN); Jie Cui, Santa Clara, CA (US); Bishwarup Mondal, San Ramon, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/408,021

(22) Filed: May 9, 2019

(65) Prior Publication Data

US 2019/0357249 A1 Nov. 21, 2019

Related U.S. Application Data

(63) Continuation of application No. 16/242,821, filed on Jan. 8, 2019.

(Continued)

(30) Foreign Application Priority Data

Feb. 16, 2018 (WO) ................ PCT/CN2018/076918

(51) Int. Cl.
*H04W 72/12* (2009.01)
*H04W 56/00* (2009.01)
(Continued)

(52) U.S. Cl.
CPC .......... *H04W 72/1289* (2013.01); *H04B 7/06* (2013.01); *H04L 5/0048* (2013.01);
(Continued)

(58) Field of Classification Search
CPC ............. H04W 72/1289; H04W 72/10; H04W 56/001; H04W 16/28; H04L 5/0048
See application file for complete search history.

(56) References Cited

U.S. PATENT DOCUMENTS

2019/0058517 A1* 2/2019 Kang .................... H04B 7/0456
2019/0239245 A1* 8/2019 Davydov ............. H04B 7/0626

OTHER PUBLICATIONS

3GPP TS 38.202, V15.1.0: NR; Services provided by the physical layer (Release 15); Valbonne—France; (Dec. 2017).
(Continued)

*Primary Examiner* — Jamal Javaid

(57) ABSTRACT

Technology for a user equipment (UE) operable for beam management is disclosed. The UE can be configured to decode, at the UE, a transmission configuration indicator (TCI), wherein the TCI is configured for a control channel and a data channel for all bandwidth parts (BWPs) of the UE or all component carriers (CCs) of the UE. The UE can be configured to decode, at the UE, a synchronization signal block (SSB) or a channel state information reference signal (CSI-RS) for beam management with a repetition parameter set to "ON" transmitted in one BWP or one CC in a first set of symbols. The UE can be configured to identify, at the UE, a scheduling restriction for the first set of symbols for the control channel and the data channel, wherein the scheduling restriction indicates that downlink transmission in the first set of symbols is not expected.

20 Claims, 14 Drawing Sheets

Related U.S. Application Data

(60) Provisional application No. 62/665,342, filed on May 1, 2018, provisional application No. 62/631,098, filed on Feb. 15, 2018, provisional application No. 62/615,157, filed on Jan. 9, 2018.

(51) Int. Cl.
*H04W 16/28* (2009.01)
*H04L 5/00* (2006.01)
*H04W 72/10* (2009.01)
*H04B 7/06* (2006.01)

(52) U.S. Cl.
CPC ......... *H04W 16/28* (2013.01); *H04W 56/001* (2013.01); *H04W 72/10* (2013.01)

(56) References Cited

OTHER PUBLICATIONS

U.S. Appl. No. 16/242,821, Notice of Allowance, 5 pages, dated Jul. 23, 2020.

* cited by examiner

BEAM MANAGEMENT FOR CARRIER AGGREGATION (CA)

RELATED APPLICATIONS

The present application is a continuation of U.S. patent application Ser. No. 16/242,821 filed Jan. 8, 2019 which claims the benefit of U.S. Provisional Patent Application No. 62/615,157 filed Jan. 9, 2018, China Provisional Patent Application No. PCT/CN2018/076918 filed Feb. 16, 2018, U.S. Provisional Patent Application No. 62/631,098 filed Feb. 15, 2018 and U.S. Provisional Patent Application No. 62/665,342 filed May 1, 2018, the entire specifications of which are each hereby incorporated by reference in their entirety for all purposes.

BACKGROUND

Wireless systems typically include multiple User Equipment (UE) devices communicatively coupled to one or more Base Stations (BS). The one or more BSs may be Long Term Evolved (LTE) evolved NodeBs (eNB) or new radio (NR) NodeBs (gNB) or next generation node Bs (gNB) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
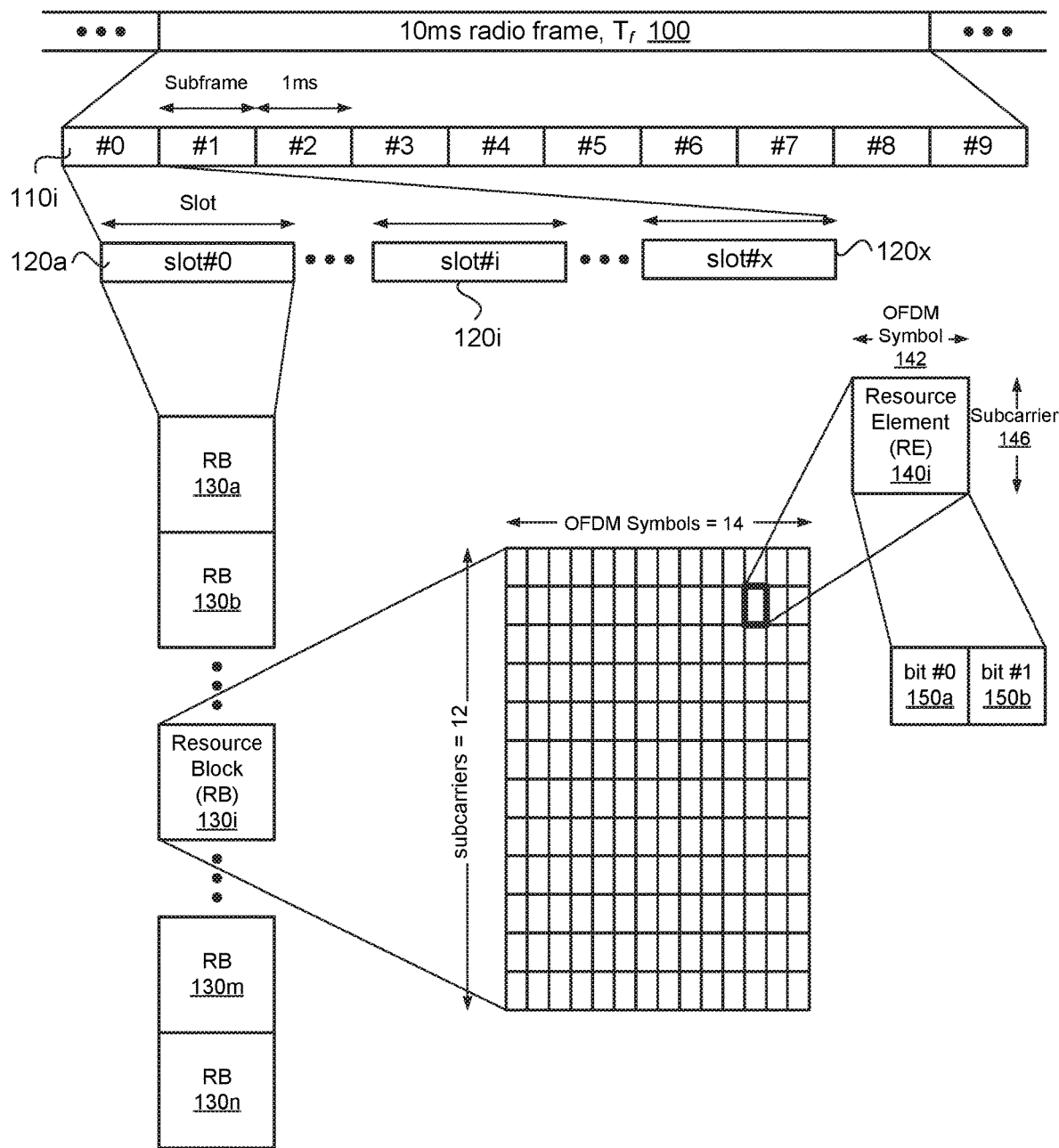
FIG. 1 illustrates a block diagram of a Third-Generation Partnership Project (3GPP) New Radio (NR) Release 15 frame structure in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In a 5G system, a UE can be configured with one or more bandwidth parts (BWPs) or one or more component carriers (CCs). In one example, when the control resource set (CORESET) in a component carrier collides with the physical downlink shared channel (PDSCH) in another component carrier, and if the UE only has one antenna panel, then the UE may not be able to receive physical downlink control channel (PDCCH) and PDSCH with different beams at the same time.

In another example, when the antenna ports used for communication of physical channels, such as the PDCCH and PDSCH, are not quasi co-located with respect to spatial receiving parameters, then the UE may not be able to receive the PDCCH and PDSCH with different beams at the same time.

In one example, a user equipment (UE) can be operable for beam management. The UE can be configured to decode, at the UE, a transmission configuration indicator (TCI), wherein the TCI is configured for a control channel and a data channel for all bandwidth parts (BWPs) of the UE or all component carriers (CCs) of the UE. The UE can be further configured to decode, at the UE, a synchronization signal block (SSB) or a channel state information reference signal (CSI-RS) for beam management with a repetition parameter set to "ON" transmitted in one BWP or one CC in a first set of symbols. The UE can be further configured to identify, at the UE, a scheduling restriction for the first set of symbols for the control channel and the data channel, wherein the scheduling restriction indicates that downlink transmission in the first set of symbols is not expected. The UE can be further configured to apply, at the UE, a priority rule for processing of information communicated in the control channel and the data channel based on a reception type.

FIG. 1 provides an example of a 3GPP NR Release 15 frame structure. In particular, FIG. 1 illustrates a downlink radio frame structure. In the example, a radio frame 100 of a signal used to transmit the data can be configured to have a duration, $T_f$, of 10 milliseconds (ms). Each radio frame can be segmented or divided into ten subframes 110$i$ that are each 1 ms long. Each subframe can be further subdivided into one or multiple slots 120$a$, 120$i$, and 120$x$, each with a duration, $T_{slot}$, of 1/µms, where µ=1 for 15 kHz subcarrier spacing, µ=2 for 30 kHz, µ=4 for 60 kHz, µ=8 for 120 kHz, and u=16 for 240 kHz. Each slot can include a physical downlink control channel (PDCCH) and/or a physical downlink shared channel (PDSCH).

Each slot for a component carrier (CC) used by the node and the wireless device can include multiple resource blocks (RBs) 130$a$, 130$b$, 130$i$, 130$m$, and 130$n$ based on the CC frequency bandwidth. The CC can have a carrier frequency having a bandwidth. Each slot of the CC can include downlink control information (DCI) found in the PDCCH. The PDCCH is transmitted in control channel resource set (CORESET) which can include one, two or three Orthogonal Frequency Division Multiplexing (OFDM) symbols and multiple RBs.

Each RB (physical RB or PRB) can include 12 subcarriers (on the frequency axis) and 14 orthogonal frequency-division multiplexing (OFDM) symbols (on the time axis) per slot. The RB can use 14 OFDM symbols if a short or normal cyclic prefix is employed. The RB can use 12 OFDM symbols if an extended cyclic prefix is used. The resource block can be mapped to 168 resource elements (REs) using short or normal cyclic prefixing, or the resource block can be mapped to 144 REs (not shown) using extended cyclic prefixing. The RE can be a unit of one OFDM symbol 142 by one subcarrier (i.e., 15 kHz, 30 kHz, 60 kHz, 120 kHz, and 240 kHz) 146.

Each RE 140$i$ can transmit two bits 150$a$ and 150$b$ of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

This example of the 3GPP NR Release 15 frame structure provides examples of the way in which data is transmitted, or the transmission mode. The example is not intended to be limiting. Many of the Release 15 features will evolve and change in the 5G frame structures included in 3GPP LTE Release 15, MulteFire Release 1.1, and beyond. In such a system, the design constraint can be on co-existence with multiple 5G numerologies in the same carrier due to the coexistence of different network services, such as eMBB (enhanced Mobile Broadband), mMTC (massive Machine Type Communications or massive IoT) and URLLC (Ultra Reliable Low Latency Communications or Critical Communications). The carrier in a 5G system can be above or below 6 GHz. In one embodiment, each network service can have a different numerology.

In one example, in a 5G system, a UE can be configured with one or more active bandwidth parts (BWPs) and/or component carriers (CCs). In another example, a UE can be configured to maintain one or more beams to transmit and/or receive signals. A beam configured for transmission and reception can increase the link budget. One or more BWPS and one or more CCs can be implemented at the UE in at least three ways including: (1) some BWPs or CCs can shared the same antenna and can share the same beam, (2) all of the BWPs and CCs can have an independent antenna and can therefore have an independent beam, and (3) one antenna or panel can cover one or more BWPs or CCs.

In another example, when some BWPs or CCs share the same antenna and therefore share the same beam, implementation can be simpler relative to a scenario when all of the BWPs and CCs have an independent antenna and therefore an independent beam.

Figure 2A:
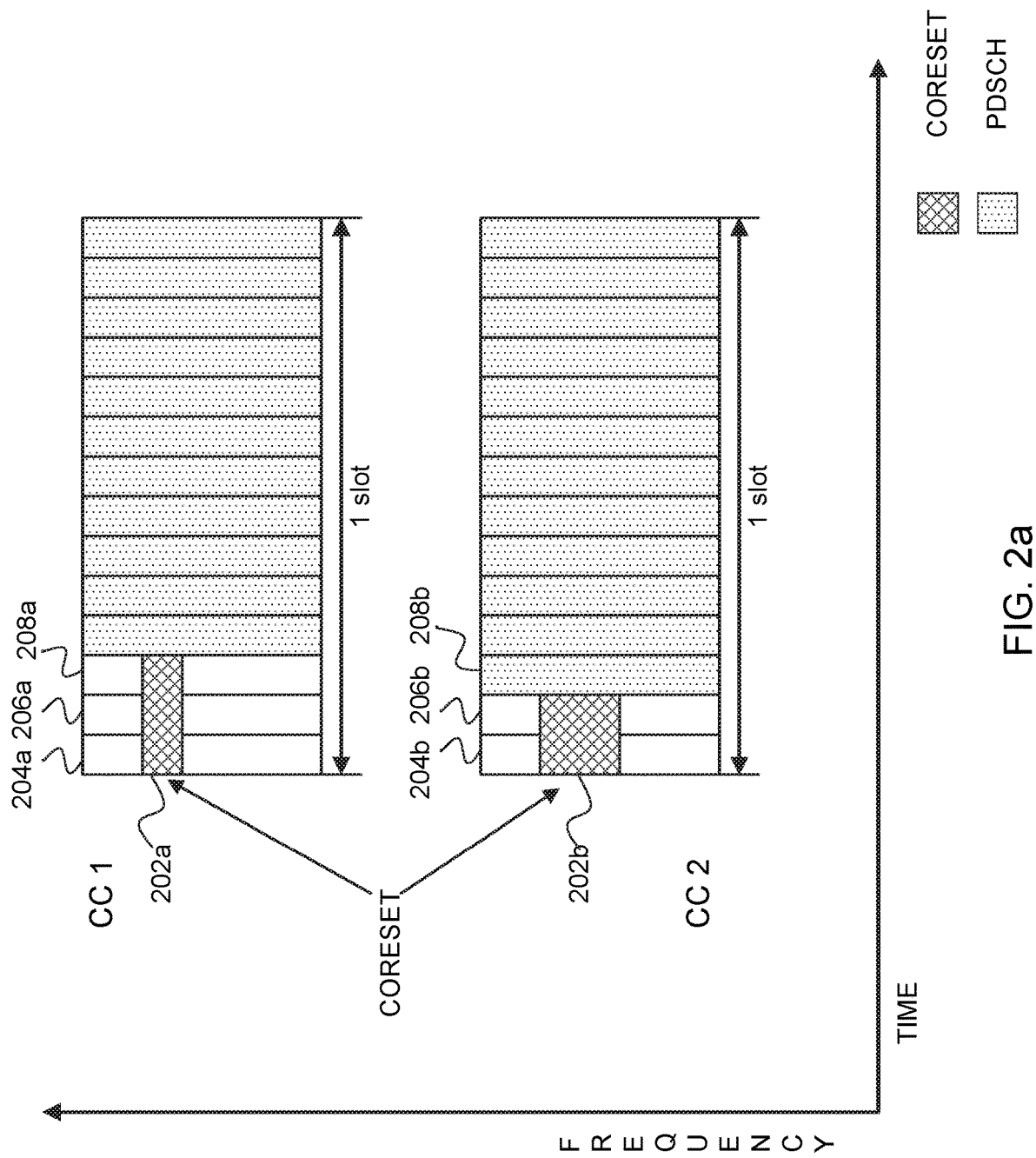
FIG. 2a illustrates beam management for carrier aggregation (CA) in accordance with an example.
Figure 2B:
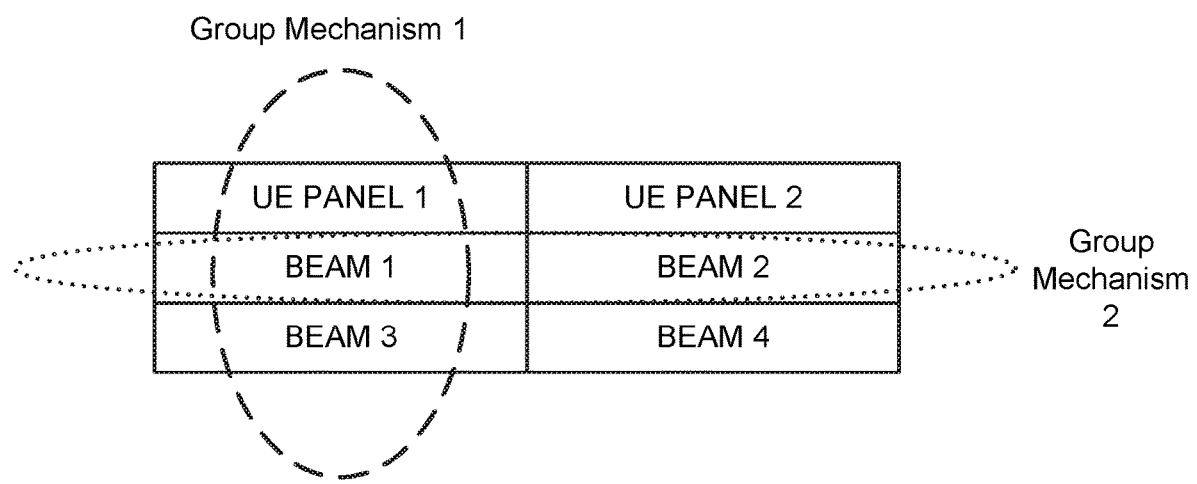
FIG. 2b illustrates a beam grouping scheme in accordance with an example.

In another example, as illustrated in FIG. 2$a$, different beams can be used for the transmission of physical downlink control channel (PDCCH) in component carrier 1 (CC1) and physical downlink shared channel (PDSCH) in component carrier 2 (CC2). The control resource set (CORESET) 202$a$ in CC1 can occupy symbols 204$a$, 206$a$, and 208$a$ in CC1 and the CORESET 202$b$ in CC2 can occupy symbols 204$b$ and 206$b$. In another example, the CORESET 202$a$ in CC1 can collide with the PDSCH in CC2, e.g., in the third symbol 208$a$ in CC1 and in the third symbol 208$b$ in CC2. If the UE only has one antenna panel, the UE may not be able to receive PDCCH and PDSCH with different beams at the same time. In another example, the gNB can schedule PDCCH and PDSCH reception on some selected CCs with a same receive panel based on the reported UE capability. The gNB can identify the CCs that share the same receive panel. In another example, the priority order of channel reception can be determined when a UE having M antenna panels is scheduled with a parallel downlink reception with N receiving beams in which M can be a positive integer less than N, which can also be a positive integer.

In another example, for a UE configured with one or more BWPs or CCs, the UE can be configured to report when the one or more BWPs or CCs share the same antenna. In another example, a UE can be configured to report the capability of the UE with respect to whether the BWPs or CCs can be quasi co-located with spatial receiving parameters or can share the same antennas. In one example, the UE can report the capability of the UE for each band. In another example, the UE can report a quasi co-location (QCL) group index for each BWP or CC or band. In another example, the BWPs or CCs or bands can share the same QCL group index when the BWPs or CCs or bands share the same antenna.

In another example, a UE can be configured with multiple panels. In this example, the beam reported by the UE can indicate whether the BWPs or CCs share the same panel. The UE can report the UE panel index and the beam information. The panel index reported by the UE can be carried based on group based beam reporting. The panel index reported by the UE can be implicitly indicated based on the group identifier or the reporting order within a group.

In another example, as illustrated in FIG. 2$b$, the panel index reported by the UE can be indicated based on the grouping scheme or grouping mechanism. In another example, for group mechanism 1, the panel index reported by the UE can be reported by the UE or implicitly indicated by the UE based on the group identifier (ID). In this example, UE panel 1 can include beam 1 and beam 3, and UE panel 2 can include beam 2 and beam 4.

In another example, as illustrated in FIG. 2$b$, for group mechanism 2, the panel index reported by the UE can be reported by the UE or implicitly indicated by the UE based on the reporting order in a group. In this example, the reporting order of beam 1 and beam 2 can implicitly indicate the panel index.

In another example, after the UE has reported whether the BWPs or CCs can share the same receiving beam at the same time, the gNB can be restricted from scheduling the UE to use different receiving beams to receive the downlink signal from one or more BWPs or one or more CCs.

In another example, one single transmission configuration indicator (TCI) can be configured for both a control channel and a data channel for all BWPs or CCs for a UE. In another example, one single transmission configuration indicator (TCI) can be configured for both a control channel and a data channel for all BWPs or CCs for a UE when more than one BWP or more than one CC share the same receiving beam at the same time. In another example, all of the control channels and all of the data channels for the UE can be quasi co-located. In another example, the data beam or physical downlink shared channel (PDSCH) beam can follow the control beam or physical downlink control channel (PDCCH) beam. In another example, when the beam switching for PDCCH occurs, the PDCCH beam for all other BWPs or CCs and all other PDSCH beams can also be modified.

In another example, more than one BWP or more than one CC can share the same receiving beam at the same time. In another example the channel state information reference signal (CSI-RS) for beam management can be configured with a repetition parameter set to 'ON.' In another example, the CSI-RS for beam management with a repetition parameter set to 'ON' can be scheduled in one BWP or CC. In another example, when more than one BWP or more than one CC share the same receiving beam at the same time and when the CSI-RS for beam management is configured with repetition='ON' and scheduled in one BWP or CC, the UE can expect that no other downlink channel or signal is to be transmitted in the same symbol(s) or slot(s) in other BWPs or CCs.

Figure 2C:
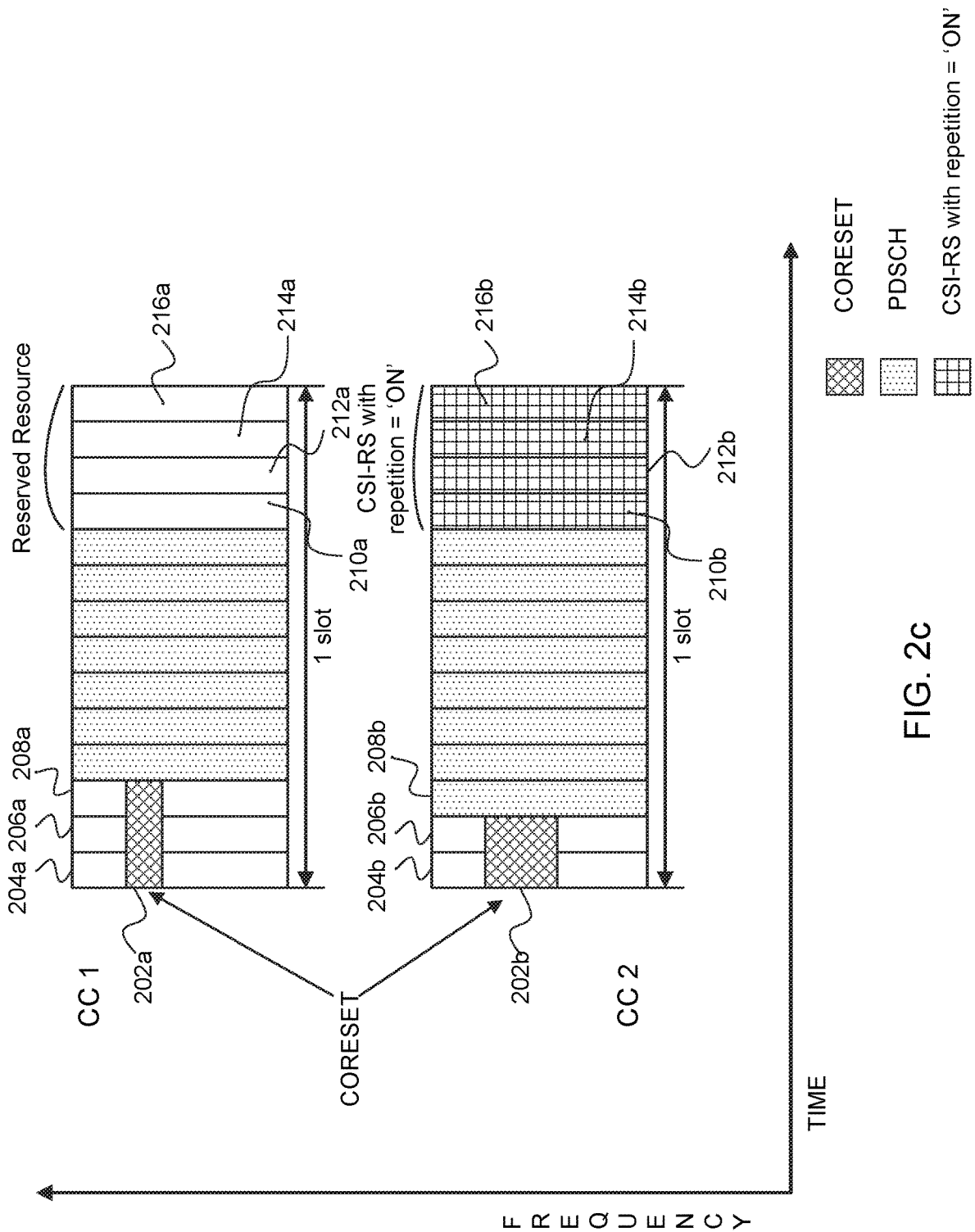
FIG. 2c illustrates resource allocation for carrier aggregation (CA) in accordance with an example.

In another example, as illustrated in FIG. 2c, the CORESET 202a can occupy symbols 204a, 206a, and 208a in CC1. In another example, the CORESET 202b can occupy symbols 204b and 206b in CC2. In this example, the CSI-RS for beam management with repetition parameter set to 'ON' can be scheduled in symbols 210b, 212b, 214b, and 216b in CC2. In this example, CC1 and CC2 can share the same receiving beam at the same time. In this example, symbol 210b can be identical to symbol 210a, symbol 212b can be identical to symbol 212a, symbol 214b can be identical to symbol 214a, and symbol 216b can be identical to symbol 216a. In this example, the UE can be configured to identify a scheduling restriction for the symbols 210b, 212b, 214b, and 216b in CC2 for a control channel and a data channel. In this example, the scheduling restriction can indicate that downlink transmission in the symbols 210a, 212a, 214a, and 216a in CC1 is not expected.

In another example, a synchronization signal block (SSB) can be transmitted in one CC or one BWP. In this example, a scheduling restriction can be identified at the UE to indicate that downlink transmission in the same symbols or slots in the other CC or the other BWP is not expected.

In another example, the PDSCH can be scheduled on orthogonal frequency division multiplexing (OFDM) symbols that can overlap with OFDM symbols of a CSI-RS. In this example, the indicated QCL assumption for the PDSCH and the CSI-RS can be different. In this example, the UE may not receive the corresponding CSI-RS.

In another example, a UE can be configured so that more than one BWP or more than one CC share the same receiving beam at one time. In this example, the gNB can configure the same subcarrier spacing for the more than one BWP or more than one CC. In this example, the gNB can configure the same time information for each CORESET, e.g. same symbol or slot index. The UE can be configured to identify that the gNB has configured the same subcarrier spacing for the more than one BWP or more than one CC. The UE can be configured to identify that the gNB has configured the same time information for each CORESET, e.g. same symbol or slot index. For one symbol, when multiple downlink signals are transmitted for one or more BWPs or for one or more CCs, the multiple downlink signals can be quasi co-located with spatial receiving parameters.

In another example, a UE can be configured so that more than one BWP or more than one CC share the same receiving beam at one time. In this example, when multiple downlink signals are transmitted for one or more BWPs or for one or more CCs, the multiple downlink signals may not be quasi co-located with spatial receiving parameters. In this example, the multiple downlink signals can be scheduled in accordance with time domain division (TDM).

In another example, reference signals and physical channels can be multiplexed on the same OFDM symbols of the same or different BWPs or of the same or different CCs. In this example, the reference signals and the physical channels may not be quasi co-located with spatial receiving parameters. In this example, the UE can be configured to apply a priority rule for processing of information communicated in the control channel and the data channel. The UE can be configured to apply the priority rule based on the reception type. The priority rule can include be based on one or more of: a radio network temporary identifier (RNTI) that can be used to schedule the data channel or PDSCH; a search space type such as a common search space (CSS) or a UE-specific search space (USS); a use case of the CSI-RS, e.g., CSI-RS for tracking, CSI-RS for beam management, CSI-RS for channel state information; a channel type, e.g., PDCCH, PDSCH, CSI-RS; a CC index; or a time domain behavior, e.g., periodic, semi-persistent, aperiodic. In one example, the priority rule for processing of the information communicated in the control channel and the data channel can be defined such that the PDCCH CSS can be prioritized over the PDSCH system information RNTI (SI-RNTI) which can be prioritized over the PDSCH random access RNTI (RA-RNTI) which can be prioritized over the PDSCH cell RNTI (C-RNTI) which can be prioritized over the CSI-RS (beam management, CSI, or tracking). In another example, the information received in the search space type, CSS, can be prioritized over the information received in the search space type, USS. In another example, the information received in the CSS can be prioritized over the information received in the USS within the same reception type. A reception type can include the PDCCH. In another example, the priority rules can be defined to include different permutations of the corresponding cases.

In another example, a UE can be configured with multiple BWPs or multiple CCs. The UE can be configured to report whether the multiple BWPs or multiple CCs share the same antenna.

In another example, for a UE configured with multiple antennas, the UE can be configured to report whether the multiple BWPs or multiple CCs share the same panel based on the sounding reference signal (SRS) resource set index. In this example, the SRS resource in different resource sets can indicate that the beam is from different panels. In one example, if two BWPs or two CCs are based on SRS resources in the same resource sets, the two BWPs or two CCs can share the same antenna panel. Alternatively, if two BWPs or two CCs are based on SRS resources in different resource sets, then two BWPs or two CCs may not share the same antenna panels. In this example, when two BWPs or two CCs do not share the same antenna panels, then the two BWPs or two CCs can use different transmission beams.

In another example, after a UE has reported whether the BWPs or CCs share the same transmission beam at the same time, the gNB can be configured to identify a scheduling restriction to avoid scheduling the UE to use different transmission beams to transmit the uplink signal from multiple BWPs or multiple CCs.

In another example, when a UE is configured with multiple BWPs or multiple CCs, and the multiple BWPs or multiple CCs share the same transmission beam at one time, then a single beam can be used for uplink transmission of uplink channels and some reference signals, e.g., physical uplink shared channel (PUSCH), physical uplink control channel (PUCCH), SRS, physical random access channel (PRACH), for codebook or non-codebook or antenna switching. The single beam can be based on one PUCCH beam that can be indicated by PUCCH-spatialRelationInfo via a medium access control (MAC) control element (CE) or radio resource control (RRC) signaling In another example, when a UE is configured with multiple BWPs or multiple CCs, and the multiple BWPs or multiple CCs share the same transmission beam at one time, the UE can be scheduled to transmit the SRS for beam management. In this scenario, the UE can identify a scheduling restriction that indicates that uplink transmission in the same symbol(s) or slot(s) is not expected.

In another example, when a UE is configured with multiple BWPs or multiple CCs, and the multiple BWPs or multiple CCs share the same transmission beam at one time, the UE can be scheduled to transmit resources for PRACH or PUCCH beam failure recovery. In this scenario, the UE can identify a scheduling restriction that indicates that uplink transmission in the same symbol(s) or slot(s) is not expected.

In another example, when a UE is configured with multiple BWPs or multiple CCs, and the multiple BWPs or multiple CCs share the same transmission beam at one time, the subcarrier spacing for the multiple BWPs or multiple CCs can be configured to be configured to be identical. In another example, for uplink signals from multiple BWPs or multiple CCs that are not spatially associated or quasi co-located with spatial receiving parameters, the uplink signals can be scheduled in accordance with TDM.

In another example, when a UE is configured or scheduled to transmit one or more uplink signals in the same symbol in the same or different BWPs or same or different CCs, the one or more uplink signals can be transmitted based on a priority rule. The one or more uplink signals can include one or more of: contention based (CB) PRACH, contention free (CF) PRACH, PUCCH, SRS, PUSCH, and the like. In one example, the priority rule can be based on the cell type, in which the primary cell (PCell) can have a higher priority than the secondary cell (SCell). In another example, the priority rule can be based on the time domain behavior of the signal, in which a periodic signal can have a higher priority than a semi-persistent signal, which can have a higher priority than an aperiodic signal. In another example, the priority rule can be based on a transmission type, in which a CB-PRACH can have a higher priority than a CF-PRACH, which can have a higher priority than a PUCCH, which can have a higher priority than an SRS. In another example, a priority rule can be defined based on different permutations of the corresponding cases.

In another example, UE capability reporting can include a set of bitmap sequences, which can be denoted by N. In this example, N can be defined and reported by the UE per band combinations. In this example, each bitmap sequence can indicate the mapping of serving cells to a shared panel that supports PDSCH reception. In this example, the bitmap size can be selected based on the number of bands in the band combination. In one example, when the number of bands in the band combination is 3, the bitmap sequence can include 3 bits. In another example, when a bit in the bit string set is equal to 1, the carriers of the corresponding band entry can use this panel for downlink and uplink transmission or reception.

In another example, a band combination can be identified as AX-BY-CZ in which A, B, and C are band indices, and N can be equal to 2. In this example, the UE can be configured to report "101" and "010" to indicate that band A and band C share a same antenna panel but a separate antenna panel is used for band B. If the UE is configured to use one panel for a time instance for reception, the gNB can identify a scheduling restriction that indicates that downlink transmission of PDSCH or PDCCH on Band A and Band B, or Band C and Band B, is not expected.

New Radio (NR) can support combinations of physical channels that can be received simultaneously in the downlink by a UE. Table 1 from 3GPP Technical Specification (TS) 38.202 version 15.0.0 defines "Reception Type." A "Reception Type" can describe a physical channel and the associated transport channels of the physical channel. Table 2 from 3GPP TS 38.202 version 15.0.0 defines the combinations of these "Reception Types." The combinations of "Reception Types" can be supported by the UE based on capabilities of the UE. The combinations of "Reception Types" can indicate the number of reception types that can be received simultaneously in the downlink by one UE.

TABLE 1

Downlink "Reception Types"

| "Reception Type" | Physical Channel(s) | Monitored RNTI | Associated Transport Channel | Comment |
| --- | --- | --- | --- | --- |
| A | PBCH | N/A | BCH | |
| B | PDCCH + PDSCH | SI-RNTI | DL-SCH | Note 1 |
| C | PDCCH + PDSCH | P-RNTI | PCH | Note 1 |
| D | PDCCH + PDSCH | RA-RNTI or Temporary C-RNTI | DL-SCH | Note 1 |
| D1 | PDCCH + PDSCH | C-RNTI, C-RNTI(s) for SPS/grant-free | DL-SCH | |
| E | PDCCH | C-RNTI | N/A | Note 2 |
| F | PDCCH | C-RNTI, C-RNTI(s) for SPS/grant-free | UL-SCH | |
| G | PDCCH | SFI-RNTI | N/A | |
| G1 | PDCCH | INT-RNTI | N/A | |
| H | PDCCH | TPC-PUSCH-RNT | N/A | |
| H1 | PDCCH | TPC-PUCCH-RNTI | N/A | |
| H2 | PDCCH | TPC-SRS-RNTI | N/A | |

Note 1:
These are received from PCell only.
Note 2:
This corresponds to PDCCH-ordered PRACH.

TABLE 2

Downlink "Reception Type" Combinations

| UE capability | Supported Combinations | Comment |
| --- | --- | --- |
| 1. RRC_IDLE | A + B + C + D | |
| 2. RRC_INACTIVE | A + B + C + D | |
| 3. RRC_CONNECTED | j × (A + B + C + D) + q × (D1 + G + G1) + p × (F + H + H1) + p' × (H2) | Note 1 |

Note 1:
In the case there is one SUL carrier, then only p-1 would be supported for (F + H).

In another example, the UE can be configured to receive downlink communications according to an indication on the PDCCH. Any subsets of the combinations specified in Table 2 can also be supported.

In another example, a UE can support simultaneous reception of the physical channels transmitted on the same or different CCs. In another example, for RRC_CONNECTED mode for a CC, UE can support simultaneous reception of the PDCCH+PDSCH associated with broadcast transmission based on SI-RNTI and paging RNTI (P-RNTI). In another example, for RRC_CONNECTED mode for a CC, UE can support simultaneous reception of the PDCCH+PDSCH associated with unicast transmission based on C-RNTI. For multi-beam operation at the UE (e.g. in frequency range 2), simultaneous reception may not be desirable, especially when the UE can only use one single receive beam in a time instance.

In another example, simultaneous reception at the UE can be supported when the antenna ports used by the physical channels are quasi co-located with respect to spatial receiving parameters. In another example, when the antenna ports used by the physical channels are not quasi co-located with respect to spatial receiving parameters, the UE can be configured to process information communicated in the physical channels according to a priority rule based on a reception type or combinations of reception types.

In another example, the UE can be configured to process a reception type according to a priority rule. The priority rule can be based on one or more of: a reception type, a combination of reception types, a carrier index, or a BWP index.

In one example, the priority rule can be based on a reception type combination. In one example, reception type combination A+B+C+D, from Table 1, can be prioritized over reception type combination D1+G+G1, from Table 1, which can be prioritized over reception type combination F+H+H1, from Table 1, which can be prioritized over reception type H2, from Table 1.

In one example, reception type combination A+B+C+D can be prioritized over receptions type combination F+H+H1 which can be prioritized over reception type combination D1+G+G1 which can be prioritized over reception type H2.

In one example, reception type combination A+B+C+D can be prioritized over reception type combination F+H+H1 which can be prioritized over reception type H2 which can be prioritized over reception type combination D1+G+G1.

In one example, reception type combination A+B+C+D can be prioritized over reception type H2 which can be prioritized over reception type combination F+H+H1 which can be prioritized over reception type combination D1+G+G1.

In one example, reception type combination A+B+C+D can be prioritized over reception type H2 which can be prioritized over reception type combination D1+G+G1 which can be prioritized over reception type combination F+H+H1.

The aforementioned combinations and priorities of reception types are not limited to the above examples. Other combinations and priorities of the reception types A, B, C, D, D1, E, F, G, G1, H, H1, and H2 can be used.

In another example, reception type combination A+B+C+D can be prioritized by the UE over other combinations. In another example, reception type PDCCH can be prioritized over reception type PDSCH.

In another example, the CC index or BWP index can be used by the UE to determine priority. The CC index or the BWP index can be used to determine priority in addition or instead of priority rules based on the reception type combinations. In one example, a CC with a lower CC index can be prioritized over a CC with a higher CC index when the same reception type combination can be received by the UE simultaneously. In another example, a CC with a higher CC index can be prioritized over a CC with a lower CC index.

In another example, the carrier index can be used by the UE to determine priority. The carrier index can be used to determine priority in addition or instead of priority rules based on the reception type combinations. In one example, a lower carrier index can be prioritized over a higher carrier index when the same reception type combination can be received by the UE simultaneously. In another example, a higher carrier index can be prioritized over a lower carrier index.

In another example, the cell index can be used by the UE to determine priority. The cell index can be used to determine priority in addition or instead of priority rules based on the reception type combinations. In one example, a lower cell index can be prioritized over a higher cell index when the same reception type combination can be received by the UE simultaneously. In another example, a higher cell index can be prioritized over a lower cell index.

In another example, the reception type, from Table 1, can be used by the UE to determine priority. In one example, a reception type A can be prioritized over reception type B which can be prioritized over reception type C which can be prioritized over reception type D which can be prioritized over reception type D1 which can be prioritized over reception type G which can be prioritized over reception type G1 which can be prioritized over reception type F which can be prioritized over reception type H which can be prioritized over reception type H1 which can be prioritized over reception type H2. The aforementioned example of priorities based on reception type is not limited and other permutations of priorities can used.

In another example, when simultaneous reception is indicated for the UE, the UE can identify a QCL assumption for all physical channels according to the reference physical channel of a certain reference type. In this example, the reference physical channel can be determined according to priority rules, wherein the priority rules can be based on one or more of a reception type, a reception type combination, a carrier index, or a bandwidth part index. In this example, the UE can assume the same QCL for all reception types according to the QCL of the reference physical channel. The priority rules to determine or process the reference physical channel can be based on any of the priority rules provided above.

In another example, the simultaneous reception of different reception types can be supported by the UE only when the same numerology, e.g., subcarrier spacing (SCS) and cyclic prefix (CP) types, is used for transmission of the corresponding reception types.

Figure 3A:
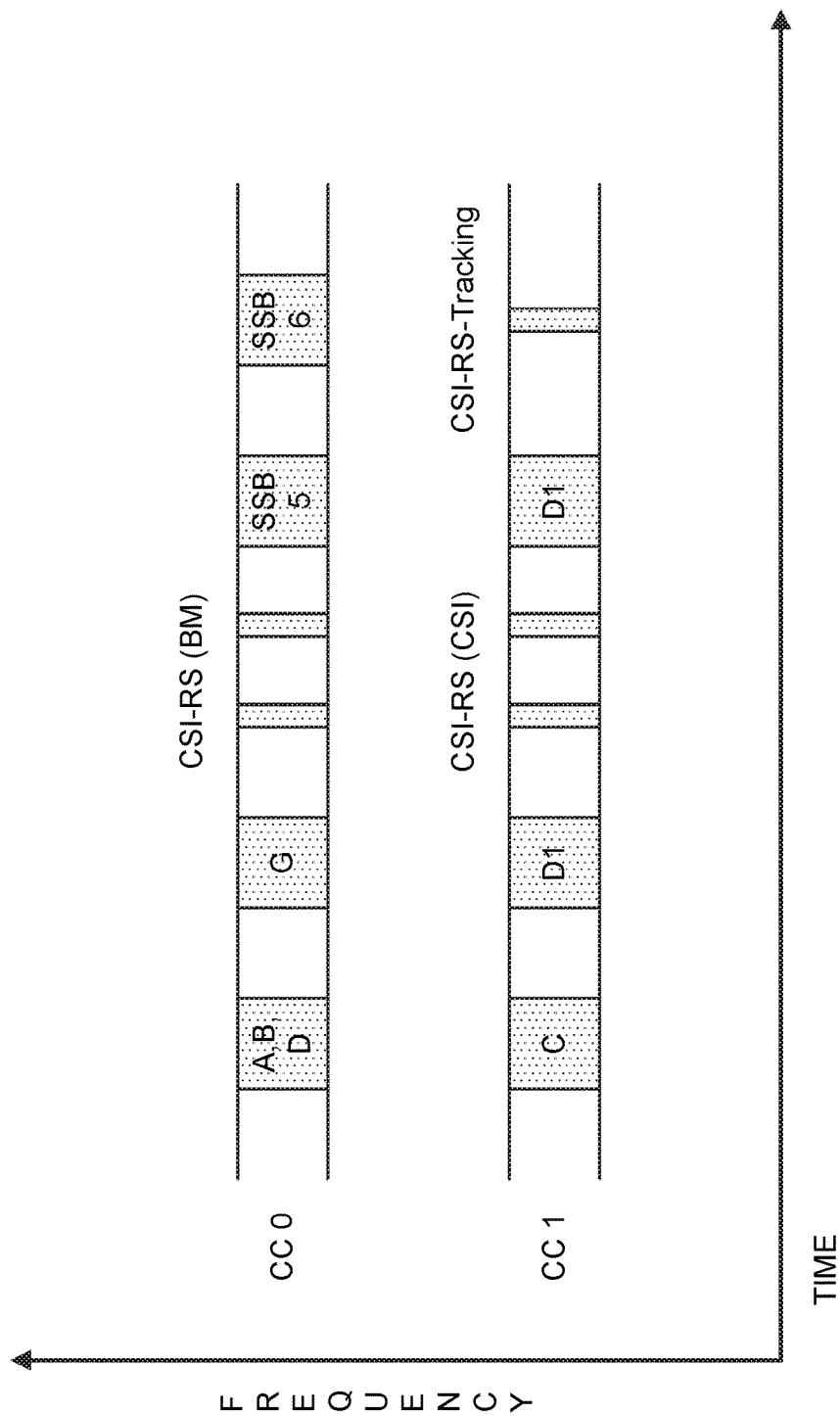
FIG. 3a illustrates intra-band carrier aggregation (CA) in accordance with an example.

In another example, as illustrated in FIG. 3a, for the case of intra-band carrier aggregation (CA), a gNB can be configured to transmit beam management reference signals, e.g., SSB and CSI-RS for beam management, in a single CC, e.g., CC0. In this example, from the UE perspective, the spatial QCL reference signals can be included in CC0. However, because of potential differences in timing synchronization at the gNB between CC0 and CC1 and because of fast-fading propagation condition differences between CC0 and CC1, the gNB can transmit CSI-RS for tracking and CSI-RS for channel state information on both CC0 and CC1.

In another example, reception at the UE of different reception types in different CCs simultaneously can be expected when the spatial QCL reference for the different reception types are equal or equivalent. The reception at the UE can occur simultaneously when the reception occurs in the same or overlapping one or more OFDM symbols with a certain time window. The spatial QCL reference for the different reception types can be equal when the spatial QCL reference for the different reception types is the same reference signal configuration or ports. The spatial QCL reference for the different reception types can be equivalent when the spatial QCL reference for the different reception types are spatially quasi co-located according to the UE. In another example, when the spatial QCL reference for the different reception types are not equal or equivalent for the simultaneously occurring receptions, the UE can assume a single common spatial QCL reference for the spatial QCL reference for the different reception types when the two different reception types are spatially quasi co-located. In another example, simultaneous reception of Reception Type B in CC0, e.g., SSB, and Reception Type D1 in CC1, e.g., PDSCH C-RNTI, can be expected only when Reception Type B and Reception Type D1 are spatially quasi co-located. In another example, Reception Type PDCCH can be prioritized over Reception Type PDSCH for the case of intra-band CA.

In another example, reception at the UE of the same reception types in different CCs simultaneously can be expected when the spatial QCL reference for the reception type in the different CCs are equal or equivalent. In another example, when the spatial QCL reference is not equal or equivalent for the simultaneously occurring receptions, the UE can assume a single common spatial QCL reference for the simultaneously occurring receptions when they are spatially quasi co-located. In another example, simultaneous reception of Reception Type D1 (PDSCH C-RNTI) in CC0 and CC1 can only be expected when Reception Type D1 in CC0 and CC1 is spatially quasi co-located.

In another example, reception at the UE of the same or different types of measurement reference signals, e.g., CSI-RS for beam management, CSI-RS for channel state information, or CSI-RS for tracking, in different CCs simultaneously can be expected when the spatial QCL reference for the measurement reference signals in the different CCs are equal or equivalent. In another example, when the spatial QCL reference is not equal or equivalent for the simultaneously occurring receptions, the UE can assume a single common spatial QCL reference for the simultaneously occurring receptions when they are spatially quasi co-located. In one example, simultaneous reception of CSI-RS for beam management in CC0 and CSI-RS for channel state information in CC1 can be expected only when the CSI-RS for beam management and the CSI-RS for channel state information are spatially quasi co-located. In one example, simultaneous reception of CSI-RS for channel state information in CC0 and CSI-RS for channel state information in CC1 can be expected only when the CSI-RS for channel state information in CC0 and the CSI-RS for channel state information in CC1 are spatially quasi co-located.

In another example, reception at the UE of a reception type in one CC and a measurement reception signal, e.g., CSI-RS for beam management, CSI-RS for channel state information, or CSI-RS for tracking, in a different CC simultaneously can be expected when the spatial QCL reference for the reception type and the measurement reference signal in the different CCs are equal or equivalent. In another example, when the spatial QCL reference is not equal or equivalent for the simultaneously occurring receptions, the UE can assume a single common spatial QCL reference for the simultaneously occurring receptions when they are spatially quasi co-located. In one example, the simultaneous reception of Reception Type D1, e.g., PDSCH C-RNTI, in CC0 and CSI-RS for channel state information in CC1 can be expected only when Reception Type D1 and CSI-RS for channel state information are spatially quasi co-located.

Figure 3B:
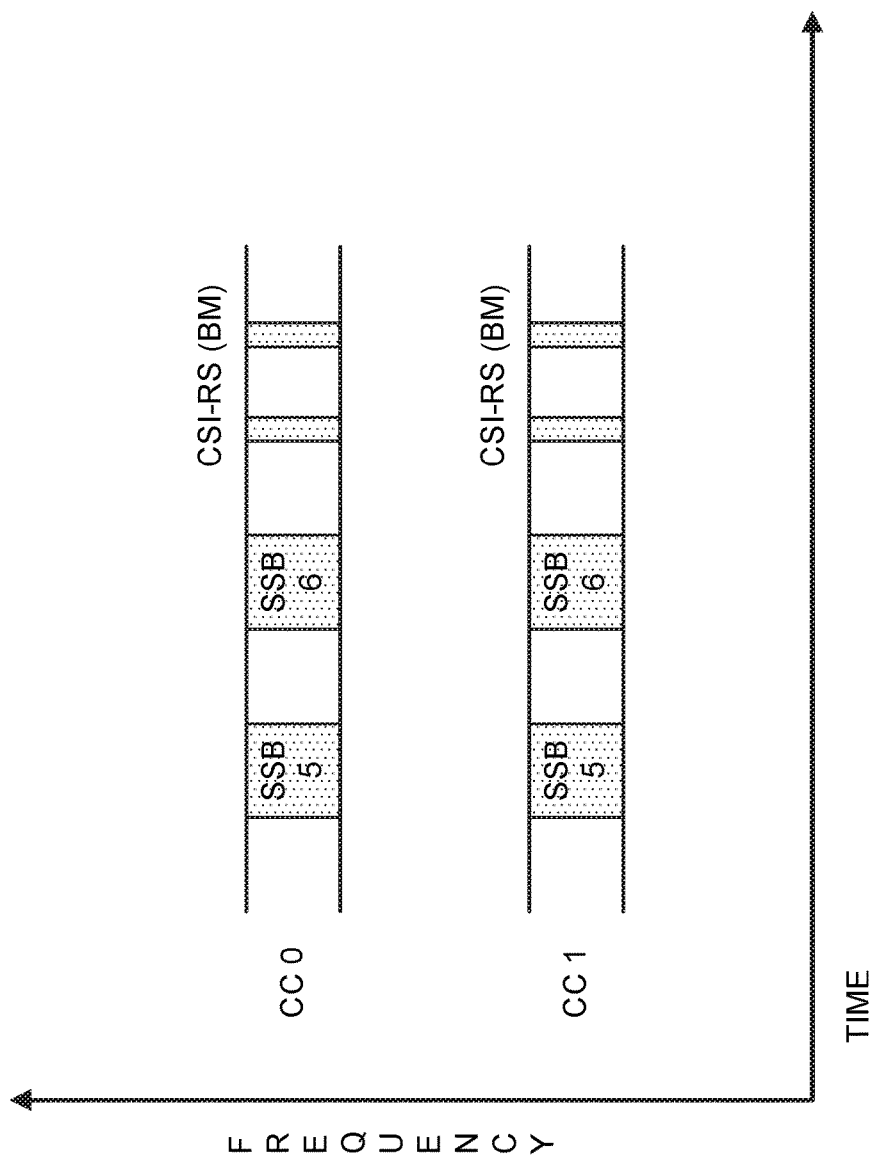
FIG. 3b illustrates intra-band carrier aggregation (CA) in accordance with an example.

In another example, as illustrated in FIG. 3b, for the case of intra-band CA, a gNB can be configured to transmit beam management reference signals, e.g., SSB and CSI-RS for beam management, in both CC0 and CC1. In this example, the beam management reference signals in CC0 and CC1 can be spatially quasi collocated. In one example, SSB 5 in CC0 can be spatially quasi co-located with SSB 5 in CC1. In one example, SSB 6 in CC0 can be spatially quasi co-located with SSB 6 in CC1. In one example, CSI-RS for beam management in CC0 can be spatially quasi co-located with CSI-RS for beam management in CC1.

In one example, a gNB can be configured to indicate to a UE that a SSB-k in CC0 is spatially quasi co-located with SSB-q in CC1, wherein k and q are positive integers. Signaling from the gNB to the UE can be provided via RRC or MAC-CE or downlink control information (DCI).

In another example, a spatial QCL reference can be defined as a set of two reference signals wherein one reference signal is included in CC0 and the other reference signal is included in CC1. In one example, a spatial QCL reference can be {SSB-k in CC0, SSB-q in CC1}.

In another example, when SSB-k in CC0 is spatially quasi co-located with SSB-q in CC1, the UE may not combine measurements from SSB-k in CC0 and SSB-q in CC1 for reporting. In one example, a UE may not average reference signal received power (RSRP) measured from SSB-k in CC0 and SSB-q in CC1 for reporting RSRP corresponding to SSB-k in CC0 or SSB-q in CC1.

In another example, when SSB-k in CC0 is spatially quasi co-located with SSB-q in CC1, the UE may not report SSB-q in CC1 as a best SSB resource when the UE reports SSB-k in CC0 as a best resource in CC0.

Figure 3C:
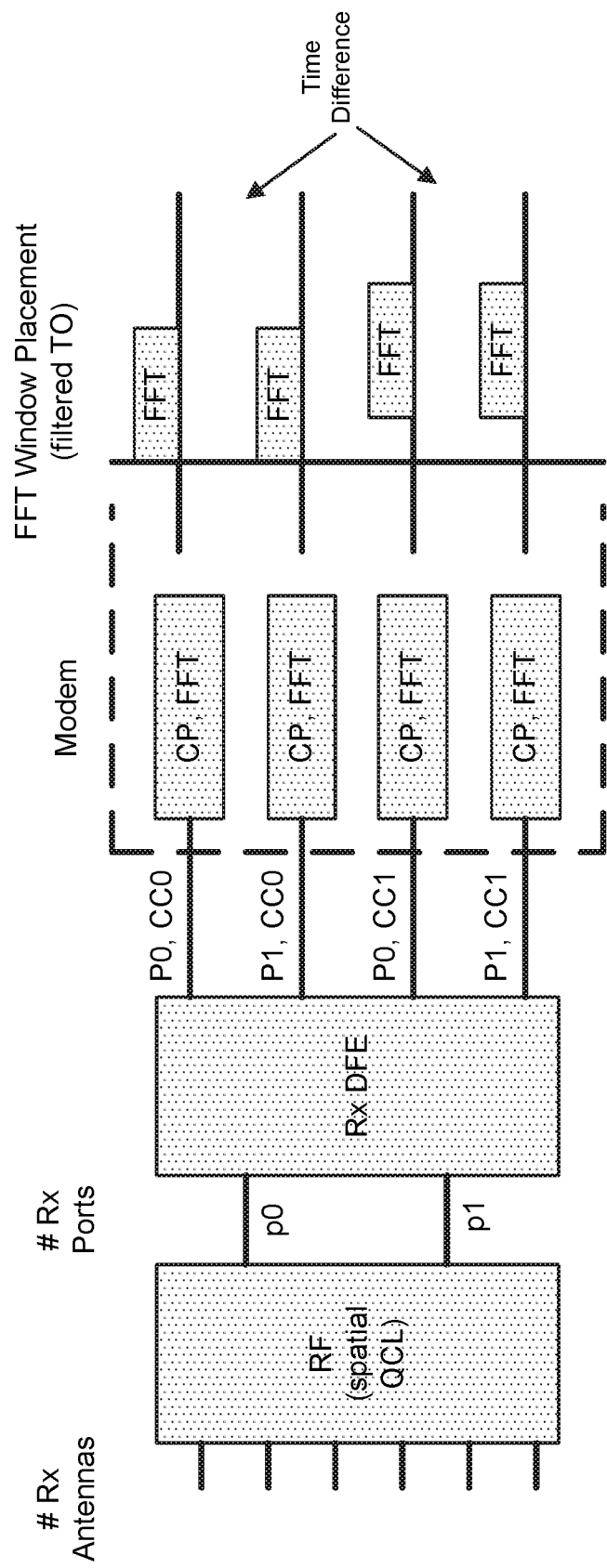
FIG. 3c illustrates intra-band carrier aggregation (CA) reception in accordance with an example.

In another example, FIG. 3c illustrates a data-flow diagram at a receiver showing intra-band CA. In this example, a single analog receive beam weight can be applied for both CC0 and CC1 at the same time even when CC0 and CC1 have a time difference between each other. The time difference between CC0 and CC1 can arise from propagation differences (in which CC0 and CC1 transmission can be non-co-located) or from gNB impairments (in which CC0 and CC1 transmission can be non-synchronized).

In another example, a certain number of guard symbols, Ng, can be defined in which the number of guard numbers, Ng, can be an integer greater than or equal to 1. In another example, a UE may not be expected to receive a first downlink transmission in CC0 in symbol n followed by a second downlink transmission in symbol in CC1 before symbol n+Ng when the spatial QCL reference for the first downlink transmission and the spatial QCL reference for the second downlink transmission are equal or equivalent. In another example, when a UE receives a first downlink transmission in CC0 in symbol n followed by a second downlink transmission in symbol in CC1 before symbol n+Ng, and when the spatial QCL reference for the first downlink transmission and the spatial QCL reference for the second downlink transmission are not equal or equivalent, then the UE can assume a single common spatial QCL reference for the first and second downlink transmissions when the first and second downlink transmission are spatially quasi co-located.

Figure 4:
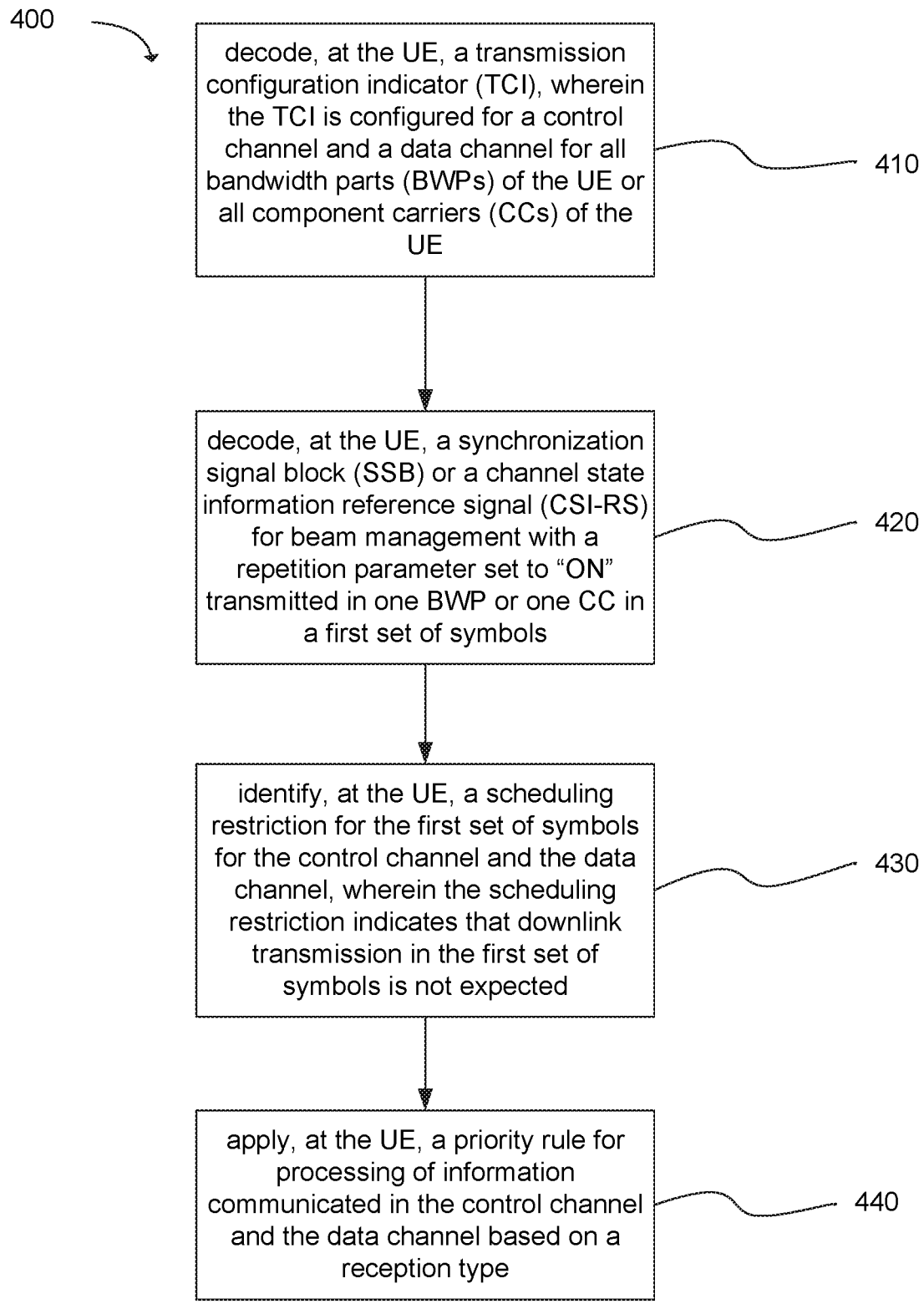
FIG. 4 depicts functionality of a user equipment (UE) operable for beam management in accordance with an example.

Another example provides functionality 400 of a UE operable for beam management, as shown in FIG. 4. The UE can comprise one or more processors. The one or more processors can be configured to decode, at the UE, a transmission configuration indicator (TCI), wherein the TCI is configured for a control channel and a data channel for all bandwidth parts (BWPs) of the UE or all component carriers (CCs) of the UE, as in block 410. The one or more processors can be configured to decode, at the UE, a synchronization signal block (SSB) or a channel state information reference signal (CSI-RS) for beam management with a repetition parameter set to "ON" transmitted in one BWP or one CC in a first set of symbols, as in block 420. The one or more processors can be configured to identify, at the UE, a scheduling restriction for the first set of symbols for the control channel and the data channel, wherein the scheduling restriction indicates that downlink transmission in the first set of symbols is not expected, as in block 430. The one or more processors can be configured to apply, at the UE, a priority rule for processing of information communicated in the control channel and the data channel based on a reception type, as in block 440. In addition, the UE can comprise a memory interface configured to send the TCI to a memory.

Figure 5:
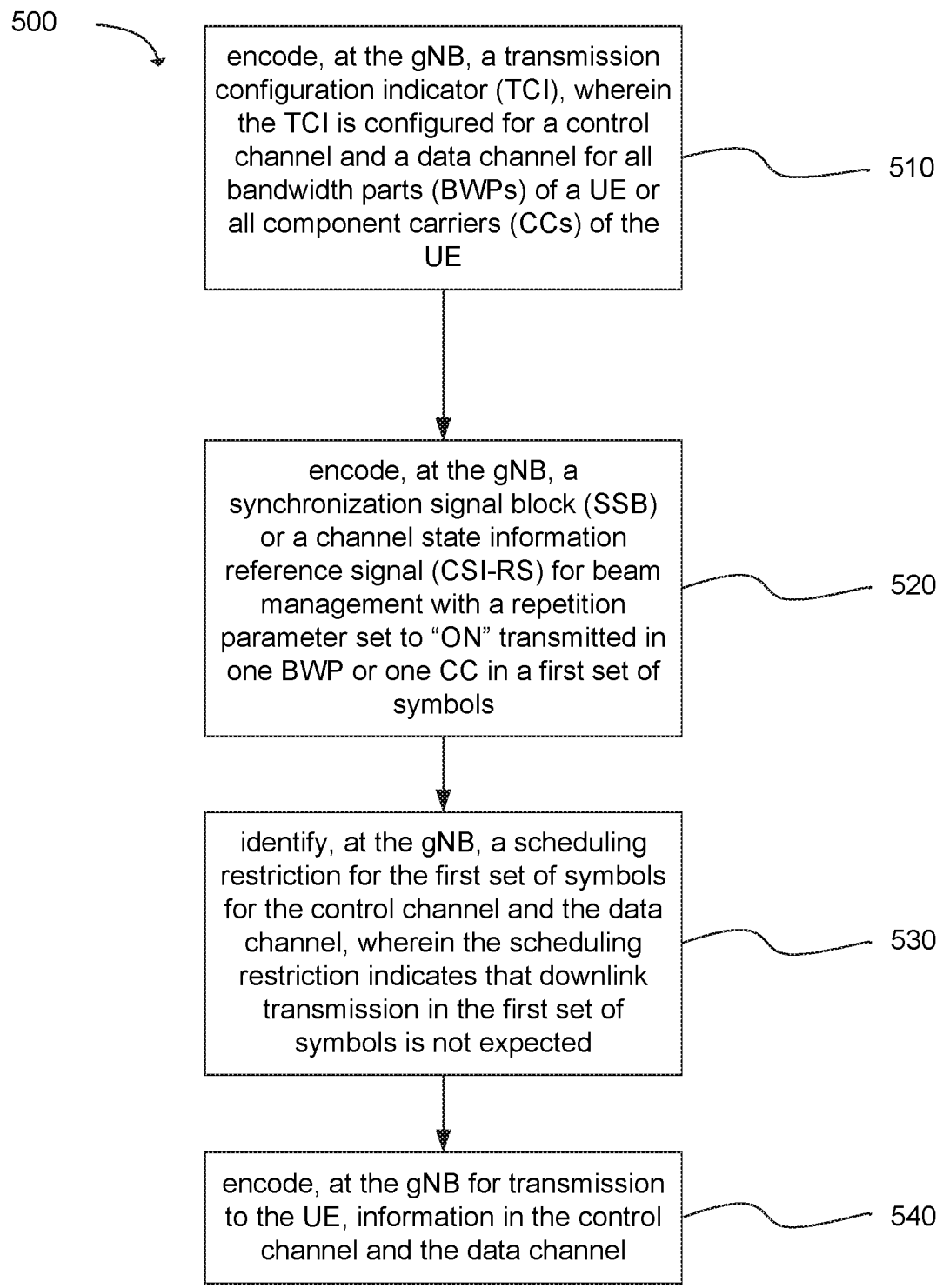
FIG. 5 depicts functionality of a next generation node B (gNB) operable for beam management in accordance with an example.

Another example provides functionality 500 of a next generation node B (gNB) operable for beam management, as shown in FIG. 5. The UE can comprise one or more processors. The one or more processors can be configured to encode, at the gNB, a transmission configuration indicator (TCI), wherein the TCI is configured for a control channel and a data channel for all bandwidth parts (BWPs) of a UE or all component carriers (CCs) of the UE, as in block 510. The one or more processors can be configured to encode, at the gNB, a synchronization signal block (SSB) or a channel state information reference signal (CSI-RS) for beam management with a repetition parameter set to "ON" transmitted in one BWP or one CC in a first set of symbols, as in block 520. The one or more processors can be configured to identify, at the gNB, a scheduling restriction for the first set of symbols for the control channel and the data channel, wherein the scheduling restriction indicates that downlink transmission in the first set of symbols is not expected, as in block 530. The one or more processors can be configured to encode, at the gNB for transmission to the UE, information in the control channel and the data channel, as in block 540. In addition, the UE can comprise a memory interface configured to retrieve the TCI from a memory.

Figure 6:
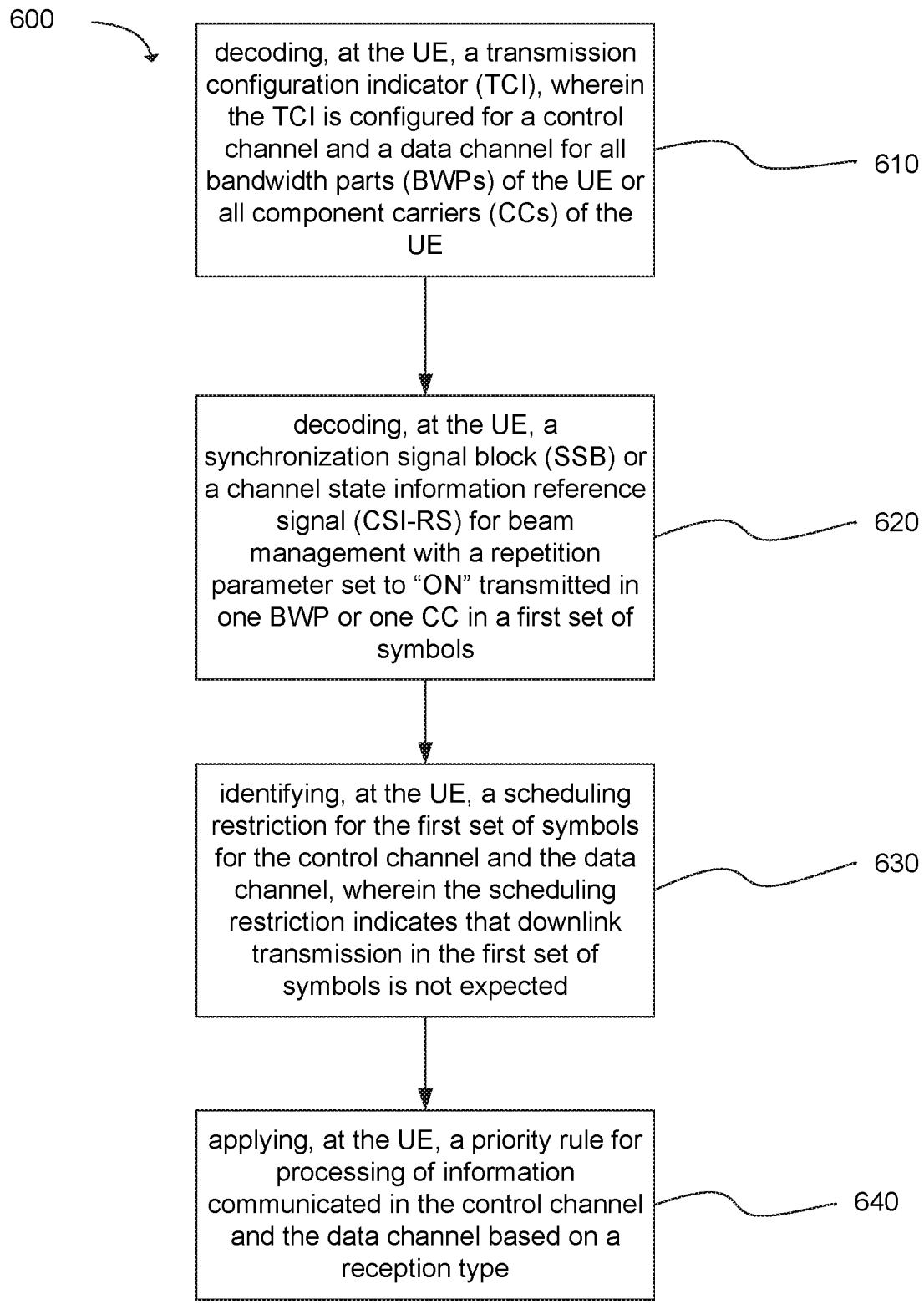
FIG. 6 depicts a flowchart of a machine readable storage medium having instructions embodied thereon for beam management in accordance with an example.

Another example provides at least one machine readable storage medium having instructions 600 embodied thereon for beam management, as shown in FIG. 6. The instructions can be executed on a machine, where the instructions are included on at least one computer readable medium or one non-transitory machine readable storage medium. The instructions when executed perform: decoding, at the UE, a transmission configuration indicator (TCI), wherein the TCI is configured for a control channel and a data channel for all bandwidth parts (BWPs) of the UE or all component carriers (CCs) of the UE, as in block 610. The instructions when executed perform: decoding, at the UE, a synchronization signal block (SSB) or a channel state information reference signal (CSI-RS) for beam management with a repetition parameter set to "ON" transmitted in one BWP or one CC in a first set of symbols, as in block 620. The instructions when executed perform: identifying, at the UE, a scheduling restriction for the first set of symbols for the control channel and the data channel, wherein the scheduling restriction indicates that downlink transmission in the first set of symbols is not expected, as in block 630. The instructions when executed perform: applying, at the UE, a priority rule for processing of information communicated in the control channel and the data channel based on a reception type as in block 640.

While examples have been provided in which a gNB has been specified, they are not intended to be limiting. An evolved node B (eNodeB) can be used in place of the gNB. Accordingly, unless otherwise stated, any example herein in which an gNB has been disclosed, can similarly be disclosed with the use of an eNodeB.

Figure 7:
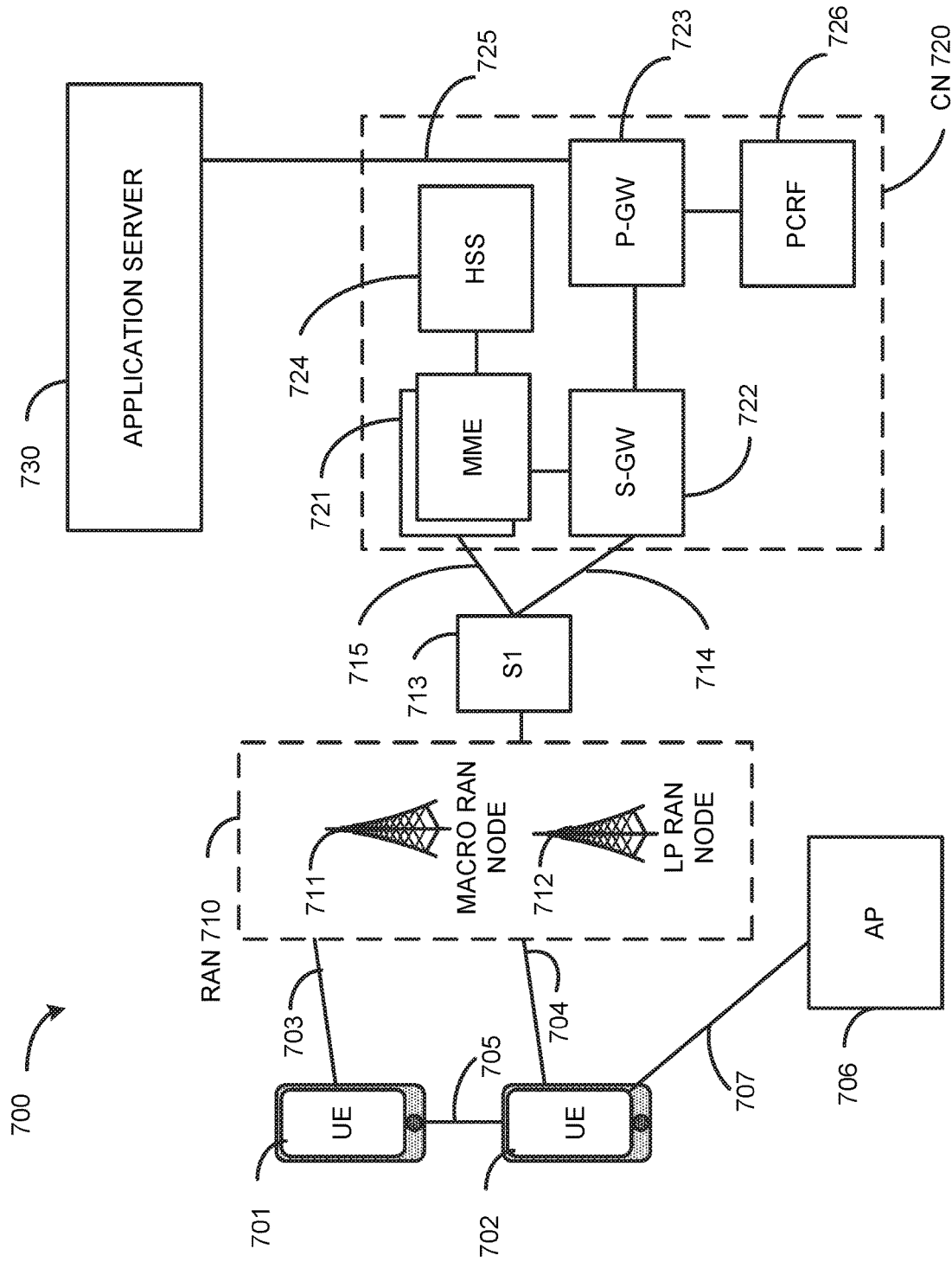
FIG. 7 illustrates an architecture of a wireless network in accordance with an example.

FIG. 7 illustrates an architecture of a system 700 of a network in accordance with some embodiments. The system 700 is shown to include a user equipment (UE) 701 and a UE 702. The UEs 701 and 702 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 701 and 702 can comprise an

Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 701 and 702 may be configured to connect, e.g., communicatively couple, with a radio access network (RAN) 710—the RAN 710 may be, for example, an Evolved Universal Mobile Telecommunications System (UMTS) Terrestrial Radio Access Network (E-UTRAN), a NextGen RAN (NG RAN), or some other type of RAN. The UEs 701 and 702 utilize connections 703 and 704, respectively, each of which comprises a physical communications interface or layer (discussed in further detail below); in this example, the connections 703 and 704 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 701 and 702 may further directly exchange communication data via a ProSe interface 705. The ProSe interface 705 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 702 is shown to be configured to access an access point (AP) 706 via connection 707. The connection 707 can comprise a local wireless connection, such as a connection consistent with any IEEE 802.15 protocol, wherein the AP 706 would comprise a wireless fidelity (WiFi®) router. In this example, the AP 706 is shown to be connected to the Internet without connecting to the core network of the wireless system (described in further detail below).

The RAN 710 can include one or more access nodes that enable the connections 703 and 704. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 710 may include one or more RAN nodes for providing macrocells, e.g., macro RAN node 711, and one or more RAN nodes for providing femtocells or picocells (e.g., cells having smaller coverage areas, smaller user capacity, or higher bandwidth compared to macrocells), e.g., low power (LP) RAN node 712.

Any of the RAN nodes 711 and 712 can terminate the air interface protocol and can be the first point of contact for the UEs 701 and 702. In some embodiments, any of the RAN nodes 711 and 712 can fulfill various logical functions for the RAN 710 including, but not limited to, radio network controller (RNC) functions such as radio bearer management, uplink and downlink dynamic radio resource management and data packet scheduling, and mobility management.

In accordance with some embodiments, the UEs 701 and 702 can be configured to communicate using Orthogonal Frequency-Division Multiplexing (OFDM) communication signals with each other or with any of the RAN nodes 711 and 712 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 711 and 712 to the UEs 701 and 702, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 701 and 702. The physical downlink control channel (PDCCH) may carry information about the transport format and resource allocations related to the PDSCH channel, among other things. It may also inform the UEs 701 and 702 about the transport format, resource allocation, and H-ARQ (Hybrid Automatic Repeat Request) information related to the uplink shared channel. Typically, downlink scheduling (assigning control and shared channel resource blocks to the UE 702 within a cell) may be performed at any of the RAN nodes 711 and 712 based on channel quality information fed back from any of the UEs 701 and 702. The downlink resource assignment information may be sent on the PDCCH used for (e.g., assigned to) each of the UEs 701 and 702.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 710 is shown to be communicatively coupled to a core network (CN) 720—via an S1 interface 713. In embodiments, the CN 720 may be an evolved packet core (EPC) network, a NextGen Packet Core (NPC) network, or some other type of CN. In this embodiment the S1 interface 713 is split into two parts: the S1-U interface 714, which carries traffic data between the RAN nodes 711 and 712 and the serving gateway (S-GW) 722, and the S1-mobility management entity (MME) interface 715, which is a signaling interface between the RAN nodes 711 and 712 and MMEs 721.

In this embodiment, the CN 720 comprises the MMEs 721, the S-GW 722, the Packet Data Network (PDN) Gateway (P-GW) 723, and a home subscriber server (HSS) 724. The MMEs 721 may be similar in function to the control plane of legacy Serving General Packet Radio Service (GPRS) Support Nodes (SGSN). The MMEs 721 may manage mobility aspects in access such as gateway selection and tracking area list management. The HSS 724 may comprise a database for network users, including subscription-related information to support the network entities' handling of communication sessions. The CN 720 may comprise one or several HSSs 724, depending on the number of mobile subscribers, on the capacity of the equipment, on the organization of the network, etc. For example, the HSS 724 can provide support for routing/roaming, authentication, authorization, naming/addressing resolution, location dependencies, etc.

The S-GW 722 may terminate the S1 interface 713 towards the RAN 710, and routes data packets between the RAN 710 and the CN 720. In addition, the S-GW 722 may be a local mobility anchor point for inter-RAN node handovers and also may provide an anchor for inter-3GPP mobility. Other responsibilities may include lawful intercept, charging, and some policy enforcement.

The P-GW 723 may terminate an SGi interface toward a PDN. The P-GW 723 may route data packets between the EPC network 723 and external networks such as a network including the application server 730 (alternatively referred to as application function (AF)) via an Internet Protocol (IP) interface 725. Generally, the application server 730 may be an element offering applications that use IP bearer resources with the core network (e.g., UMTS Packet Services (PS) domain, LTE PS data services, etc.). In this embodiment, the P-GW 723 is shown to be communicatively coupled to an application server 730 via an IP communications interface 725. The application server 730 can also be configured to support one or more communication services (e.g., Voice-over-Internet Protocol (VoIP) sessions, PTT sessions, group communication sessions, social networking services, etc.) for the UEs 701 and 702 via the CN 720.

The P-GW 723 may further be a node for policy enforcement and charging data collection. Policy and Charging Enforcement Function (PCRF) 726 is the policy and charging control element of the CN 720. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 726 may be communicatively coupled to the application server 730 via the P-GW 723. The application server 730 may signal the PCRF 726 to indicate a new service flow and select the appropriate Quality of Service (QoS) and charging parameters. The PCRF 726 may provision this rule into a Policy and Charging Enforcement Function (PCEF) (not shown) with the appropriate traffic flow template (TFT) and QoS class of identifier (QCI), which commences the QoS and charging as specified by the application server 730.

Figure 8:
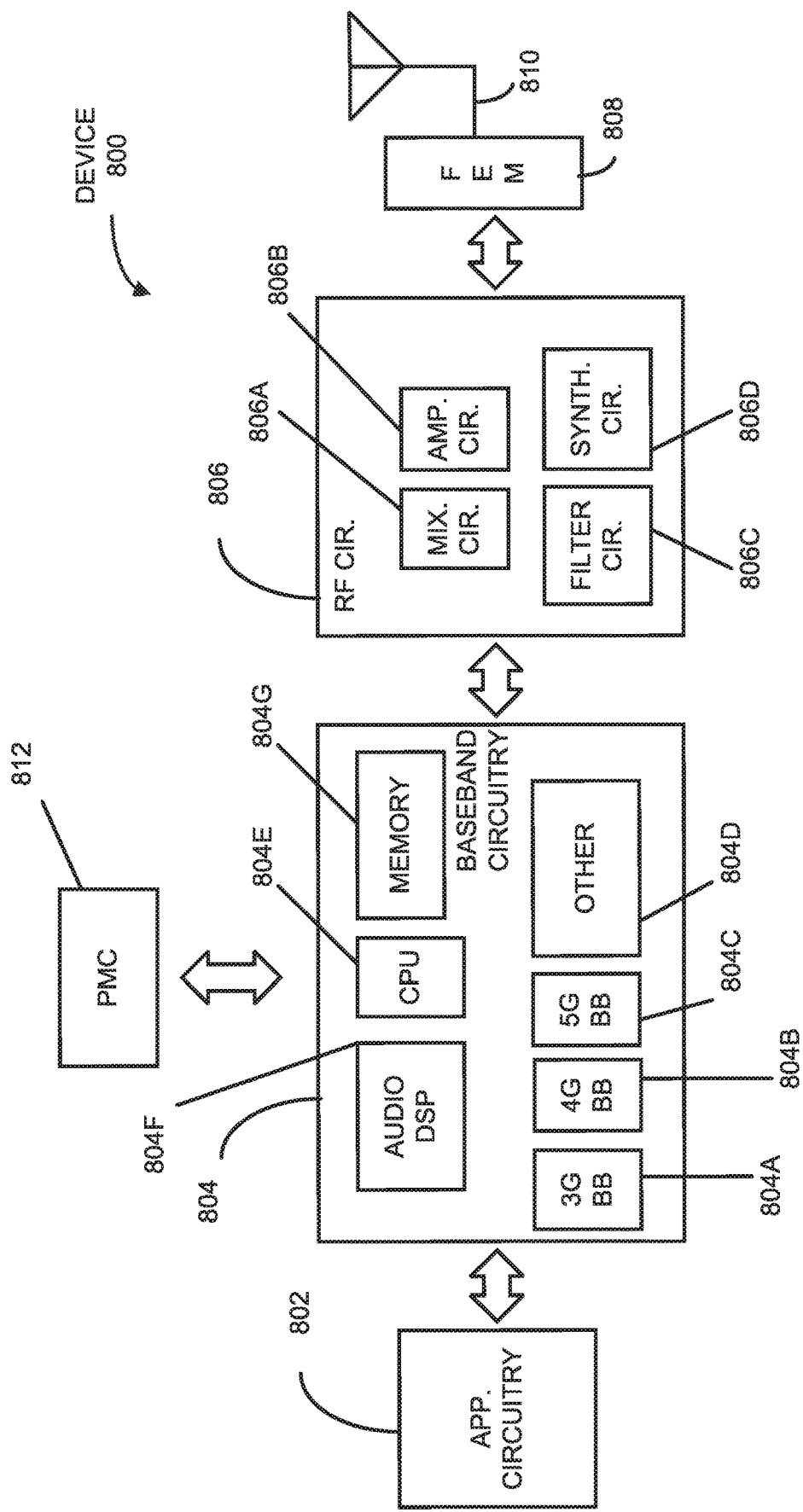
FIG. 8 illustrates a diagram of a wireless device (e.g., UE) in accordance with an example.

FIG. 8 illustrates example components of a device 800 in accordance with some embodiments. In some embodiments, the device 800 may include application circuitry 802, baseband circuitry 804, Radio Frequency (RF) circuitry 806, front-end module (FEM) circuitry 808, one or more antennas 810, and power management circuitry (PMC) 812 coupled together at least as shown. The components of the illustrated device 800 may be included in a UE or a RAN node. In some embodiments, the device 800 may include less elements (e.g., a RAN node may not utilize application circuitry 802, and instead include a processor/controller to process IP data received from an EPC). In some embodiments, the device 800 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 800. In some embodiments, processors of application circuitry 802 may process IP data packets received from an EPC.

The baseband circuitry 804 may include circuitry such as, but not limited to, one or more single-core or multi-core processors. The baseband circuitry 804 may include one or more baseband processors or control logic to process baseband signals received from a receive signal path of the RF circuitry 806 and to generate baseband signals for a transmit signal path of the RF circuitry 806. Baseband processing circuity 804 may interface with the application circuitry 802 for generation and processing of the baseband signals and for controlling operations of the RF circuitry 806. For example, in some embodiments, the baseband circuitry 804 may include a third generation (3G) baseband processor 804*a*, a fourth generation (4G) baseband processor 804*b*, a fifth generation (5G) baseband processor 804*c*, or other baseband processor(s) 804*d* for other existing generations, generations in development or to be developed in the future (e.g., second generation (2G), sixth generation (6G), etc.). The baseband circuitry 804 (e.g., one or more of baseband processors 804*a-d*) may handle various radio control functions that enable communication with one or more radio networks via the RF circuitry 806. In other embodiments, some or all of the functionality of baseband processors 804*a-d* may be included in modules stored in the memory 804*g* and executed via a Central Processing Unit (CPU) 804*e*. The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, or constellation mapping/demapping functionality. In some embodiments, encoding/decoding circuitry of the baseband circuitry 804 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include one or more audio digital signal processor(s) (DSP) 804*f*. The audio DSP(s) 804*f* may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 804 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the receive signal path of the RF circuitry 806 may include mixer circuitry 806a, amplifier circuitry 806b and filter circuitry 806c. In some embodiments, the transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a necessity. In some embodiments, mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 804 and may be filtered by filter circuitry 806c.

In some embodiments, the mixer circuitry 806a of the receive signal path and the mixer circuitry 806a of the transmit signal path may include two or more mixers and may be arranged for quadrature downconversion and upconversion, respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a may be arranged for direct downconversion and direct upconversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806d may be a fractional-N synthesizer or a fractional N/N+1 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some embodiments, frequency input may be provided by a voltage controlled oscillator (VCO), although that is not a necessity. Divider control input may be provided by either the baseband circuitry 804 or the applications processor 802 depending on the desired output frequency. In some embodiments, a divider control input (e.g., N) may be determined from a look-up table based on a channel indicated by the applications processor 802.

Synthesizer circuitry 806d of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806d may be configured to generate a carrier frequency as the output frequency, while in other embodiments, the output frequency may be a multiple of the carrier frequency (e.g., twice the carrier frequency, four times the carrier frequency)

and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path which may include circuitry configured to operate on RF signals received from one or more antennas 810, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 810. In various embodiments, the amplification through the transmit or receive signal paths may be done solely in the RF circuitry 806, solely in the FEM 808, or in both the RF circuitry 806 and the FEM 808.

In some embodiments, the FEM circuitry 808 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 810).

In some embodiments, the PMC 812 may manage power provided to the baseband circuitry 804. In particular, the PMC 812 may control power-source selection, voltage scaling, battery charging, or DC-to-DC conversion. The PMC 812 may often be included when the device 800 is capable of being powered by a battery, for example, when the device is included in a UE. The PMC 812 may increase the power conversion efficiency while providing desirable implementation size and heat dissipation characteristics.

While FIG. 8 shows the PMC 812 coupled only with the baseband circuitry 804. However, in other embodiments, the PMC 812 may be additionally or alternatively coupled with, and perform similar power management operations for, other components such as, but not limited to, application circuitry 802, RF circuitry 806, or FEM 808.

In some embodiments, the PMC 812 may control, or otherwise be part of, various power saving mechanisms of the device 800. For example, if the device 800 is in an RRC_Connected state, where it is still connected to the RAN node as it expects to receive traffic shortly, then it may enter a state known as Discontinuous Reception Mode (DRX) after a period of inactivity. During this state, the device 800 may power down for brief intervals of time and thus save power.

If there is no data traffic activity for an extended period of time, then the device 800 may transition off to an RRC_Idle state, where it disconnects from the network and does not perform operations such as channel quality feedback, handover, etc. The device 800 goes into a very low power state and it performs paging where again it periodically wakes up to listen to the network and then powers down again. The device 800 may not receive data in this state, in order to receive data, it can transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 802 and processors of the baseband circuitry 804 may be used to execute elements of one or more instances of a protocol stack. For example, processors of the baseband circuitry 804, alone or in combination, may be used execute Layer 3, Layer 2, or Layer 1 functionality, while processors of the application circuitry 804 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 9:
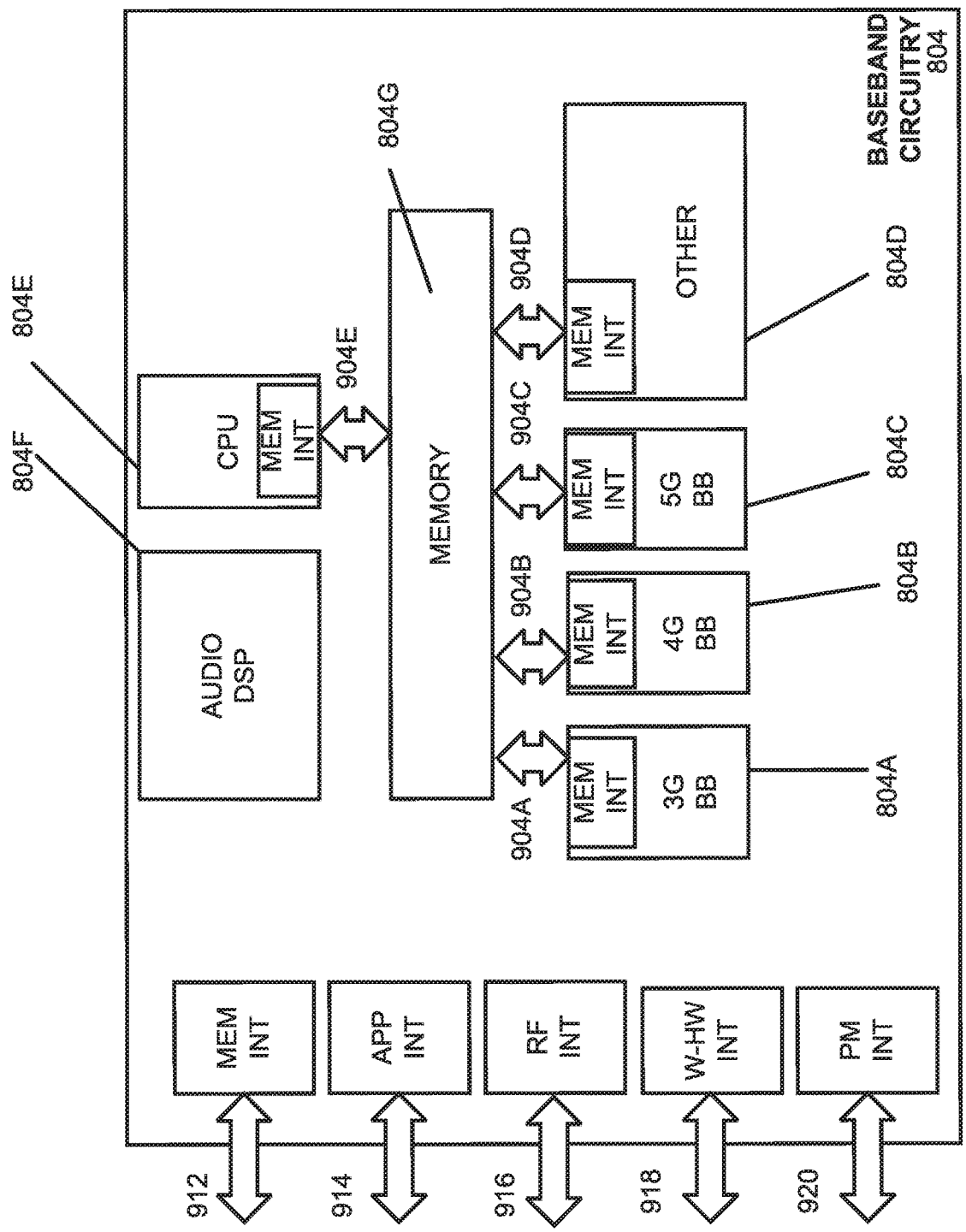
FIG. 9 illustrates interfaces of baseband circuitry in accordance with an example.

FIG. 9 illustrates example interfaces of baseband circuitry in accordance with some embodiments. As discussed above, the baseband circuitry 804 of FIG. 8 may comprise processors 804a-804e and a memory 804g utilized by said processors. Each of the processors 804a-804e may include a memory interface, 904a-904e, respectively, to send/receive data to/from the memory 804g.

The baseband circuitry 804 may further include one or more interfaces to communicatively couple to other circuitries/devices, such as a memory interface 912 (e.g., an interface to send/receive data to/from memory external to the baseband circuitry 804), an application circuitry interface 914 (e.g., an interface to send/receive data to/from the application circuitry 802 of FIG. 8), an RF circuitry interface 916 (e.g., an interface to send/receive data to/from RF circuitry 806 of FIG. 8), a wireless hardware connectivity interface 918 (e.g., an interface to send/receive data to/from Near Field Communication (NFC) components, Bluetooth® components (e.g., Bluetooth® Low Energy), Wi-Fi® components, and other communication components), and a power management interface 920 (e.g., an interface to send/receive power or control signals to/from the PMC 812.

Figure 10:
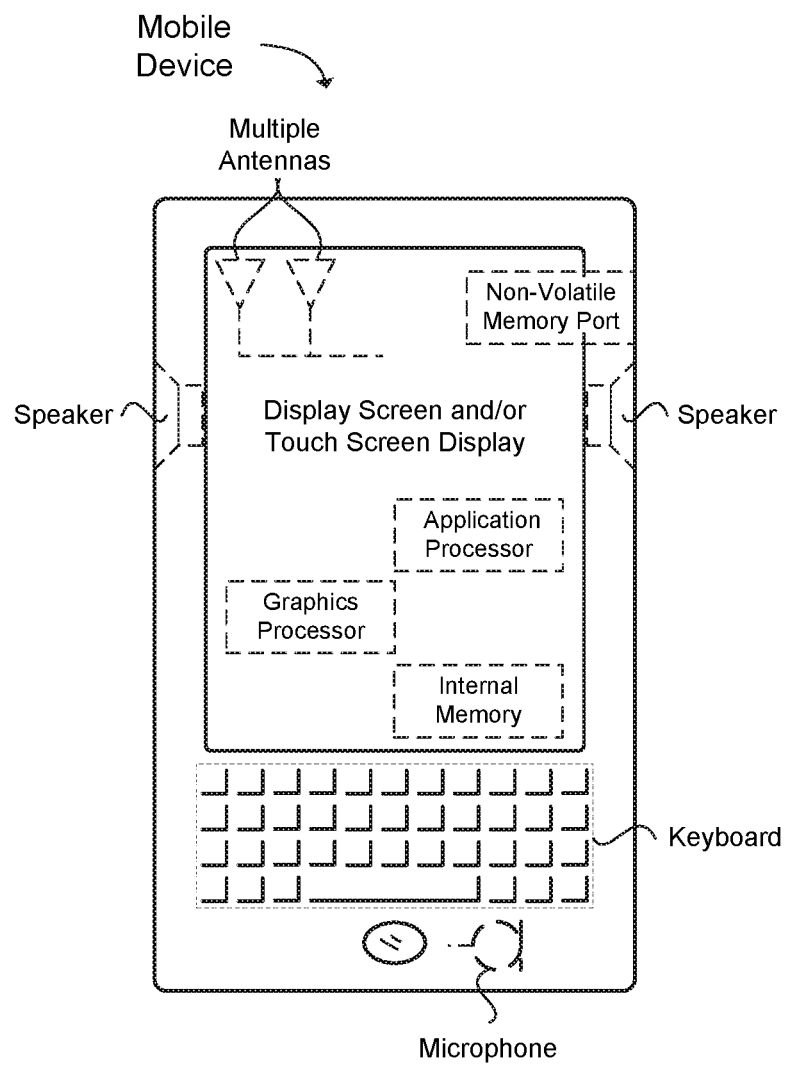
FIG. 10 illustrates a diagram of a wireless device (e.g., UE) in accordance with an example.

FIG. 10 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 10 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a user equipment (UE) operable for beam management, the apparatus comprising: one or more processors configured to: decode, at the UE, a transmission configuration indicator (TCI), wherein the TCI is configured for a control channel and a data channel for all bandwidth parts (BWPs) of the UE or all component carriers (CCs) of the UE; decode, at the UE, a synchronization signal block (SSB) or a channel state information reference signal (CSI-RS) for beam management with a repetition parameter set to "ON" transmitted in one BWP or one CC in a first set of symbols; identify, at the UE, a scheduling restriction for the first set of symbols for the control channel and the data channel, wherein the scheduling restriction indicates that downlink transmission in the first set of symbols is not expected; and apply, at the UE, a priority rule for processing of information communicated in the control channel and the data channel based on a reception type; and a memory interface configured to send the TCI to a memory.

Example 2 includes the apparatus of Example 1, wherein the one or more processors are further configured to: apply, at the UE, the priority rule for processing of the information in the control channel and the data channel based on a carrier index or a component carrier (CC) index.

Example 3 includes the apparatus of Example 1, wherein the one or more processors are further configured to: apply, at the UE, the priority rule for processing of the information in the control channel and the data channel based on a cell index, wherein the information on a lowest index of one or more cells is prioritized.

Example 4 includes the apparatus of Example 1, wherein the one or more processors are further configured to: apply, at the UE, the priority rule for processing of the control channel and the data channel for intra-band carrier aggregation (CA), wherein the priority rule indicates that the control channel is prioritized over the data channel.

Example 5 includes the apparatus of Example 1, wherein the one or more processors are further configured to: apply, at the UE, a spatial quasi co-location (QCL) assumption for the simultaneous reception of a reference signal and the information communicated via the control channel or the data channel.

Example 6 includes the apparatus of Example 1, wherein the one or more processors are further configured to: apply, at the UE, a priority rule for processing of information communicated in the reception type of the physical downlink control channel (PDCCH) based on a search space type, wherein the search space type is one of a common search space (CSS) or a UE-specific search space (USS), and the information received in the CSS is prioritized over information received in the USS.

Example 7 includes the apparatus of Example 1, wherein the one or more processors are further configured to: apply, at the UE, a quasi co-location (QCL) assumption for the simultaneous reception of the information communicated via the control channel and the data channel, wherein the QCL assumption is based on a received reference signal.

Example 8 includes an apparatus of a next generation node B (gNB) operable for beam management, the apparatus comprising: one or more processors configured to: encode, at the gNB, a transmission configuration indicator (TCI), wherein the TCI is configured for a control channel and a data channel for all bandwidth parts (BWPs) of a UE or all component carriers (CCs) of the UE; encode, at the gNB, a synchronization signal block (SSB) or a channel state information reference signal (CSI-RS) for beam management with a repetition parameter set to "ON" transmitted in one BWP or one CC in a first set of symbols; identify, at the gNB, a scheduling restriction for the first set of symbols for the control channel and the data channel, wherein the scheduling restriction indicates that downlink transmission in the first set of symbols is not expected; and encode, at the gNB for transmission to the UE, information in the control channel and the data channel; and a memory interface configured to retrieve the TCI from a memory.

Example 9 includes the apparatus of Example 8, wherein the information in the control channel and the data channel includes a carrier index or a component carrier (CC) index.

Example 10 includes the apparatus of Example 8, wherein the information in the control channel and the data channel includes a cell index.

Example 11 includes the apparatus of Example 8, wherein the one or more processors are further configured to: encode, at the gNB for transmission to the UE, information in the control channel and the data channel using intra-band carrier aggregation (CA).

Example 12 includes the apparatus of Example 8, wherein the one or more processors are further configured to: encode, at the gNB for transmission to the UE, a reference signal.

Example 13 includes at least one machine readable storage medium having instructions embodied thereon for beam management, the instructions when executed by one or more processors at a user equipment (UE) perform the following: decoding, at the UE, a transmission configuration indicator (TCI), wherein the TCI is configured for a control channel and a data channel for all bandwidth parts (BWPs) of the UE or all component carriers (CCs) of the UE; decoding, at the UE, a synchronization signal block (SSB) or a channel state information reference signal (CSI-RS) for beam management with a repetition parameter set to "ON" transmitted in one BWP or one CC in a first set of symbols; identifying, at the UE, a scheduling restriction for the first set of symbols for the control channel and the data channel, wherein the scheduling restriction indicates that downlink transmission in the first set of symbols is not expected; and applying, at the UE, a priority rule for processing of information communicated in the control channel and the data channel based on a reception type.

Example 14 includes the at least one machine readable storage medium of Example 13, further comprising instructions that when executed perform: applying, at the UE, the priority rule for processing of the information in the control channel and the data channel based on a carrier index or a component carrier (CC) index.

Example 15 includes the at least one machine readable storage medium of Example 13, further comprising instructions that when executed perform: applying, at the UE, the priority rule for processing of the information in the control channel and the data channel based on a cell index, wherein the information on a lowest index of one or more cells is prioritized.

Example 16 includes the at least one machine readable storage medium of Example 13, further comprising instructions that when executed perform: applying, at the UE, the priority rule for processing of the control channel and the data channel for intra-band carrier aggregation (CA), wherein the priority rule indicates that the control channel is prioritized over the data channel.

Example 17 includes the at least one machine readable storage medium of Example 13, further comprising instructions that when executed perform: applying, at the UE, a spatial quasi co-location (QCL) assumption for the simultaneous reception of a reference signal and the information communicated via the control channel or the data channel.

Example 18 includes the at least one machine readable storage medium of Example 13, further comprising instructions that when executed perform: applying, at the UE, a priority rule for processing of information communicated in the reception type of the physical downlink control channel (PDCCH) based on a search space type, wherein the search space type is one of a common search space (CSS) or a UE-specific search space (USS), and the information received in the CSS is prioritized over information received in the USS.

Example 19 includes the at least one machine readable storage medium of Example 13, further comprising instructions that when executed perform: applying, at the UE, a quasi co-location (QCL) assumption for the simultaneous reception of the information communicated via the control channel and the data channel, wherein the QCL assumption is based on a received reference signal.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a user equipment (UE) operable for beam management, the apparatus comprising:
one or more processors configured to:
decode, at the UE, a transmission configuration indicator (TCI), wherein the TCI is configured for a control channel and a data channel for all bandwidth parts (BWPs) of the UE;
decode, at the UE, a synchronization signal block (SSB) transmitted in one BWP in a first set of symbols;
identify, at the UE, a scheduling restriction for the first set of symbols for the control channel and the data channel, wherein the scheduling restriction indicates that downlink transmission in the first set of symbols is not expected; and
apply, at the UE, a priority rule for processing of information communicated in the control channel and the data channel based on a reception type; and
a memory interface configured to send the TCI to a memory.

2. The apparatus of claim 1, wherein the one or more processors are further configured to:
apply, at the UE, the priority rule for processing of the information in the control channel and the data channel based on a cell index, wherein the information on a lowest index of one or more cells is prioritized.

3. The apparatus of claim 1, wherein the one or more processors are further configured to:
apply, at the UE, the priority rule for processing of the control channel and the data channel for intra-band carrier aggregation (CA), wherein the priority rule indicates that the control channel is prioritized over the data channel.

4. The apparatus of claim 1, wherein the one or more processors are further configured to:
apply, at the UE, a spatial quasi co-location (QCL) assumption for the simultaneous reception of a reference signal and the information communicated via the control channel or the data channel.

5. The apparatus of claim 1, wherein the one or more processors are further configured to:
apply, at the UE, a priority rule for processing of information communicated in the reception type of the physical downlink control channel (PDCCH) based on a search space type, wherein the search space type is one of a common search space (CSS) or a UE-specific search space (USS), and the information received in the CSS is prioritized over information received in the USS.

6. The apparatus of claim 1, wherein the one or more processors are further configured to:
apply, at the UE, a quasi co-location (QCL) assumption for the simultaneous reception of the information communicated via the control channel and the data channel, wherein the QCL assumption is based on a received reference signal.

7. The apparatus of claim 1, wherein the UE includes an antenna, a touch sensitive display screen, a speaker, a microphone, a graphics processor, an application processor, an internal memory, a non-volatile memory port, or combinations thereof.

8. An apparatus of a next generation node B (gNB) operable for beam management, the apparatus comprising:
one or more processors configured to:
encode, at the gNB, a transmission configuration indicator (TCI), wherein the TCI is configured for a control channel and a data channel for all bandwidth parts (BWPs) of the UE;
encode, at the gNB, a synchronization signal block (SSB) transmitted in one BWP in a first set of symbols;
identify, at the gNB, a scheduling restriction for the first set of symbols for the control channel and the data channel, wherein the scheduling restriction indicates that downlink transmission in the first set of symbols is not expected; and
identify, at the gNB, a priority rule for processing of information communicated in the control channel and the data channel based on a reception type; and
a memory interface configured to send the TCI to a memory.

9. The apparatus of claim 8, wherein the one or more processors are further configured to:
identify, at the gNB, the priority rule for processing of the information in the control channel and the data channel based on a cell index, wherein the information on a lowest index of one or more cells is prioritized.

10. The apparatus of claim 8, wherein the one or more processors are further configured to:
identify, at the gNB, the priority rule for processing of the control channel and the data channel for intra-band carrier aggregation (CA), wherein the priority rule indicates that the control channel is prioritized over the data channel.

11. The apparatus of claim 8, wherein the one or more processors are further configured to:
   identify, at the gNB, a spatial quasi co-location (QCL) assumption for the simultaneous reception of a reference signal and the information communicated via the control channel or the data channel.

12. The apparatus of claim 8, wherein the one or more processors are further configured to:
   identify, at the gNB, a priority rule for processing of information communicated in the reception type of the physical downlink control channel (PDCCH) based on a search space type, wherein the search space type is one of a common search space (CSS) or a UE-specific search space (USS), and the information received in the CSS is prioritized over information received in the USS.

13. The apparatus of claim 8, wherein the one or more processors are further configured to:
   identify, at the gNB, a quasi co-location (QCL) assumption for the simultaneous reception of the information communicated via the control channel and the data channel, wherein the QCL assumption is based on a received reference signal.

14. At least one non-transitory machine readable storage medium having instructions embodied thereon for beam management, the instructions when executed by one or more processors at a user equipment (UE) perform the following:
   decoding, at the UE, a transmission configuration indicator (TCI), wherein the TCI is configured for a control channel and a data channel for all bandwidth parts (BWPs) of the UE;
   decoding, at the UE, a synchronization signal block (SSB) transmitted in one BWP in a first set of symbols;
   identifying, at the UE, a scheduling restriction for the first set of symbols for the control channel and the data channel, wherein the scheduling restriction indicates that downlink transmission in the first set of symbols is not expected; and
   applying, at the UE, a priority rule for processing of information communicated in the control channel and the data channel based on a reception type.

15. The at least one non-transitory machine readable storage medium of claim 14, further comprising instructions that when executed perform:
   applying, at the UE, the priority rule for processing of the information in the control channel and the data channel based on a cell index, wherein the information on a lowest index of one or more cells is prioritized.

16. The at least one non-transitory machine readable storage medium of claim 14, further comprising instructions that when executed perform:
   applying, at the UE, the priority rule for processing of the control channel and the data channel for intra-band carrier aggregation (CA), wherein the priority rule indicates that the control channel is prioritized over the data channel.

17. The at least one non-transitory machine readable storage medium of claim 14, further comprising instructions that when executed perform:
   applying, at the UE, a spatial quasi co-location (QCL) assumption for the simultaneous reception of a reference signal and the information communicated via the control channel or the data channel.

18. The at least one non-transitory machine readable storage medium of claim 14, further comprising instructions that when executed perform:
   applying, at the UE, a priority rule for processing of information communicated in the reception type of the physical downlink control channel (PDCCH) based on a search space type, wherein the search space type is one of a common search space (CSS) or a UE-specific search space (USS), and the information received in the CSS is prioritized over information received in the USS.

19. The at least one non-transitory machine readable storage medium of claim 14, further comprising instructions that when executed perform:
   applying, at the UE, a quasi co-location (QCL) assumption for the simultaneous reception of the information communicated via the control channel and the data channel, wherein the QCL assumption is based on a received reference signal.

20. The at least one non-transitory machine readable storage medium of claim 14, further comprising instructions that when executed perform:
   applying, at the UE, the priority rule for processing of the information in the control channel and the data channel based on a carrier index or a component carrier (CC) index.

* * * * *